(12) United States Patent
Tsai et al.

(10) Patent No.: US 12,379,524 B2
(45) Date of Patent: Aug. 5, 2025

(54) OPTICAL IMAGING LENS ASSEMBLY COMPRISING A GRADIENT REFRACTIVE COATING HAVING A PLURALITY OF HOLES, IMAGING APPARATUS AND ELECTRONIC DEVICE

(71) Applicant: LARGAN PRECISION CO., LTD., Taichung (TW)

(72) Inventors: Wen-Yu Tsai, Taichung (TW); Chien-Pang Chang, Taichung (TW); Cheng-Yu Tsai, Taichung (TW); Chun-Hung Teng, Taichung (TW); Kuo-Chiang Chu, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 539 days.

(21) Appl. No.: 17/820,604

(22) Filed: Aug. 18, 2022

(65) Prior Publication Data

US 2023/0073044 A1 Mar. 9, 2023

Related U.S. Application Data

(60) Provisional application No. 63/239,434, filed on Sep. 1, 2021.

(30) Foreign Application Priority Data

Aug. 3, 2022 (TW) .................................. 111129234

(51) Int. Cl.
*G02B 1/115* (2015.01)
*G02B 3/00* (2006.01)
*G02B 5/04* (2006.01)

(52) U.S. Cl.
CPC ............ *G02B 1/115* (2013.01); *G02B 3/0087* (2013.01); *G02B 5/04* (2013.01)

(58) Field of Classification Search
None
See application file for complete search history.

(56) References Cited

U.S. PATENT DOCUMENTS 9,291,748 B2   3/2016  Momoki et al.
9,828,281 B2   11/2017 Kuang
(Continued)

FOREIGN PATENT DOCUMENTS

CN   105016619 A   11/2015
CN   109478005 A   3/2019
(Continued)

OTHER PUBLICATIONS

Christoffer Kauppinen et al., "Grass-like Alumina with Low Refractive Index for Scalable, Broadband, Omnidirectional Antireflection Coatings on Glass Using Atomic Layer Deposition", ACS Applied Materials & Interfaces, published on Apr. 11, 2017, vol. 9, Issue 17, pp. 15038-15043, published by American Chemical Society, U.S.A.
(Continued)

*Primary Examiner* — Paul C Lee
(74) *Attorney, Agent, or Firm* — McClure, Qualey & Rodack, LLP

(57) ABSTRACT

An optical imaging lens assembly includes at least one optical lens element. The optical lens element includes an anti-reflective coating, and the anti-reflective coating is arranged on at least one surface of the optical lens element. The anti-reflective coating includes a high-low refractive coating and a gradient refractive coating, and the high-low refractive coating is arranged between the optical lens element and the gradient refractive coating. The high-low refractive coating includes at least one high refractive coating layer and at least one low refractive coating layer, which are stacked in alternations. The low refractive coating layer is in contact with the optical lens element. The gradient refractive coating includes a plurality of holes, and the holes
(Continued)

away from the optical lens element are relatively larger than the holes close to the optical lens element.

24 Claims, 16 Drawing Sheets

(56) References Cited

U.S. PATENT DOCUMENTS

| | | |
|---|---|---|
| 2001/0004300 A1 | 6/2001 | Tanaka et al. |
| 2005/0233113 A1 | 10/2005 | Kotani et al. |
| 2006/0134433 A1 | 6/2006 | Vaula et al. |
| 2006/0199040 A1 | 9/2006 | Yamada et al. |
| 2008/0102259 A1 | 5/2008 | Nikolov et al. |
| 2009/0022954 A1 | 1/2009 | Kotani et al. |
| 2009/0081361 A1 | 3/2009 | Yamada et al. |
| 2009/0219620 A1 | 9/2009 | Yamada et al. |
| 2010/0119782 A1 | 5/2010 | Ohgane |
| 2010/0220377 A1 | 9/2010 | Yamada et al. |
| 2011/0019277 A1 | 1/2011 | Sager et al. |
| 2011/0176216 A1 | 7/2011 | Kawauchi et al. |
| 2012/0075688 A1 | 3/2012 | Yamada et al. |
| 2012/0081792 A1 | 4/2012 | Neuffer |
| 2012/0176681 A1 | 7/2012 | Chang et al. |
| 2012/0212827 A1 | 8/2012 | Kakegawa |
| 2012/0229906 A1 | 9/2012 | Miyahara |
| 2012/0275027 A1 | 11/2012 | Okuno |
| 2013/0016430 A1 | 1/2013 | Ogawa et al. |
| 2013/0027779 A1 | 1/2013 | Okuno et al. |
| 2013/0140675 A1 | 6/2013 | Chen et al. |
| 2013/0201562 A1 | 8/2013 | Kawagishi et al. |
| 2013/0228942 A1 | 9/2013 | Ohgane |
| 2013/0258480 A1 | 10/2013 | Makino et al. |
| 2013/0260096 A1 | 10/2013 | Shiki et al. |
| 2013/0271842 A1 | 10/2013 | Miyahara et al. |
| 2013/0273317 A1 | 10/2013 | Nakayama |
| 2013/0329295 A1 | 12/2013 | Okuno |
| 2014/0016189 A1 | 1/2014 | Tamura et al. |
| 2014/0063610 A1 | 3/2014 | Murata et al. |
| 2014/0117397 A1 | 5/2014 | Saeki et al. |
| 2014/0254019 A1 | 9/2014 | Murata et al. |
| 2014/0320968 A1 | 10/2014 | Murata et al. |
| 2014/0320970 A1 | 10/2014 | Kamiyam et al. |
| 2014/0329072 A1 | 11/2014 | Hirasawa et al. |
| 2015/0055222 A1* | 2/2015 | Tamada ............ G02B 1/115 359/581 |
| 2015/0153484 A1 | 6/2015 | Neuffer |
| 2015/0160377 A1 | 6/2015 | Kuroda et al. |
| 2015/0219798 A1 | 8/2015 | Sonoda |
| 2015/0369967 A1 | 12/2015 | Okuno et al. |
| 2016/0054476 A1 | 2/2016 | Choi et al. |
| 2016/0061996 A1 | 3/2016 | Ishimatsu |
| 2016/0216409 A1 | 7/2016 | Schulz et al. |
| 2016/0266281 A1* | 9/2016 | Marshall ............ G02B 1/116 |
| 2016/0377767 A1 | 12/2016 | Sonoda et al. |
| 2017/0160437 A1 | 6/2017 | Nakayama |
| 2017/0212278 A1* | 7/2017 | Abe ............ G02B 1/115 |
| 2017/0276839 A1 | 9/2017 | Teramoto |
| 2018/0100957 A1 | 4/2018 | Ye et al. |
| 2018/0194619 A1 | 7/2018 | Greer et al. |
| 2018/0203162 A1 | 7/2018 | Schulz et al. |
| 2019/0016593 A1 | 1/2019 | Greer et al. |
| 2019/0196064 A1 | 6/2019 | Nakamura et al. |
| 2020/0240011 A1 | 7/2020 | Kauppinen et al. |
| 2021/0067713 A1* | 3/2021 | Voelker ............ H04N 23/55 |

FOREIGN PATENT DOCUMENTS

| | | |
|---|---|---|
| CN | 111201455 A | 5/2020 |
| DE | 102016100914 A1 | 7/2017 |
| JP | 2001017907 A | 1/2001 |
| JP | 2011215440 A | 10/2011 |
| TW | M591177 U | 2/2020 |
| TW | 202037930 A | 10/2020 |

OTHER PUBLICATIONS

Kirill Isakov et al., "Superhydrophobic Antireflection Coating on Glass Using Grass-like Alumina and Fluoropolymer", ACS Applied Materials & Interfaces, published on Oct. 21, 2020, vol. 12, Issue 44, pp. 49957-49962, published by American Chemical Society, U.S.A.

Takeharu Okuno et al., "The Development of Subwavelength Structure Coating (SWC)", Journal of The Society of Photographic Science and Technology of Japan, published in 2011, vol. 74, Issue 6, pp. 302-307, published by The Society of Photographic Science and Technology of Japan, Japan.

* cited by examiner

OPTICAL IMAGING LENS ASSEMBLY COMPRISING A GRADIENT REFRACTIVE COATING HAVING A PLURALITY OF HOLES, IMAGING APPARATUS AND ELECTRONIC DEVICE

RELATED APPLICATIONS

This application claims priority to U.S. Provisional Application Ser. No. 63/239,434, filed Sep. 1, 2021, and Taiwan Application Serial Number 111129234, filed Aug. 3, 2022, which are herein incorporated by references.

BACKGROUND

Technical Field

The present disclosure relates to an optical imaging lens assembly and an imaging apparatus. More particularly, the present disclosure relates to an optical imaging lens assembly and an imaging apparatus applicable to electronic devices with great anti-reflectivity.

Description of Related Art

The effect of reducing reflections in a wide field of wavelength by the coating layers of the conventional anti-reflective coating (ARC) techniques is insufficient. The image quality becomes lower because of the strong light in the long-wavelength range. When the incident angle increases, the difference of track lengths of the incident light between the coating layers is insufficient to achieve the conditions for destructive interference because the inner light path increases, and the severe reflection problem of light incident on the surface of the lens element with large angle could not be solved. According to the properties of glass materials, a clearer image can be provided as the dispersion is smaller. Although it significantly helps to correct the dispersion of the imaging lens with large aperture diameter, the anti-oxidation ability to the moisture and oxygen in the air is relatively poor. The conventional anti-reflective coating techniques are mainly achieved by the solidification or deposition of the plating material on the touched surface. The uniformity of the coating is directly related to the covering compactivity, the diameter of material particles and the flatness of the touched surface. The conventional anti-reflective coating techniques are usually limited to the optical lens elements with extreme surface shape changes, and the requirement of reducing the reflectance of lens elements for the high-end optical systems cannot be satisfied. Therefore, it has been an important goal to develop a coating technique with excellent protection for the substrates and great anti-reflectivity in the high-end optical systems whose surface shape is highly changeable.

SUMMARY

According to one aspect of the present disclosure, an optical imaging lens assembly includes at least one optical lens element. The at least one optical lens element is made of glass, and the optical lens element includes an anti-reflective coating, and the anti-reflective coating is arranged on at least one surface of the optical lens element including the anti-reflective coating. The anti-reflective coating includes a high-low refractive coating and a gradient refractive coating, and the high-low refractive coating is arranged between the optical lens element including the anti-reflective coating and the gradient refractive coating. The high-low refractive coating includes at least one high refractive coating layer and at least one low refractive coating layer, the high refractive coating layer and the low refractive coating layer are stacked in alternations, the low refractive coating layer is in contact with the optical lens element including the anti-reflective coating, and the low refractive coating layer is mainly made of aluminum oxide. The gradient refractive coating includes a plurality of holes, the holes away from the optical lens element including the anti-reflective coating are relatively larger than the holes close to the optical lens element including the anti-reflective coating, and the gradient refractive coating is mainly made of metal oxide. When a total thickness of the anti-reflective coating at a central region of the optical lens element including the anti-reflective coating is Tc, and a total thickness of the anti-reflective coating at a peripheral region of the optical lens element including the anti-reflective coating is Tp, the following condition is satisfied: $0\% < |Tc-Tp|/Tc \le 15.0\%$.

According to another aspect of the present disclosure, an imaging apparatus includes the aforementioned optical imaging lens assembly and an image sensor. The image sensor is disposed on an image surface of the optical imaging lens assembly.

According to one another aspect of the present disclosure, an electronic device, which is a vehicle device, includes the aforementioned imaging apparatus.

According to still another aspect of the present disclosure, an optical imaging lens assembly includes at least two optical lens elements and at least one optical element. At least one of the optical lens elements includes a long-wavelength absorbing material, the optical lens element including the long-wavelength absorbing material is made of a plastic material, and the long-wavelength absorbing material is evenly mixed with the plastic material. At least one of the optical lens elements includes a long-wavelength filtering coating, the long-wavelength filtering coating is arranged on an object-side surface or an image-side surface of the optical lens element including the long-wavelength filtering coating, the long-wavelength filtering coating includes a plurality of high refractive coating layers and a plurality of low refractive coating layers, and the high refractive coating layers of the long-wavelength filtering coating and the low refractive coating layers of the long-wavelength filtering coating are stacked in alternations. The optical element is made of glass, the optical element includes an anti-reflective coating, the anti-reflective coating of the optical element is arranged on at least one surface of the optical element including the anti-reflective coating, and the optical element including the anti-reflective coating is a planar lens element. The anti-reflective coating of the optical element includes a high-low refractive coating and a gradient refractive coating, and the high-low refractive coating is arranged between the optical element including the anti-reflective coating and the gradient refractive coating. The high-low refractive coating includes at least one high refractive coating layer and at least one low refractive coating layer, the high refractive coating layer of the high-low refractive coating and the low refractive coating layer of the high-low refractive coating are stacked in alternations, the low refractive coating layer of the high-low refractive coating is in contact with the optical element including the anti-reflective coating, and the low refractive coating layer of the high-low refractive coating is mainly made of aluminum oxide. The gradient refractive coating includes a plurality of holes, the holes away from the optical element including the anti-reflective coating are relatively larger than the holes close to the optical element including the anti-reflective coating, and the gradient refractive coating is mainly made of metal oxide.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
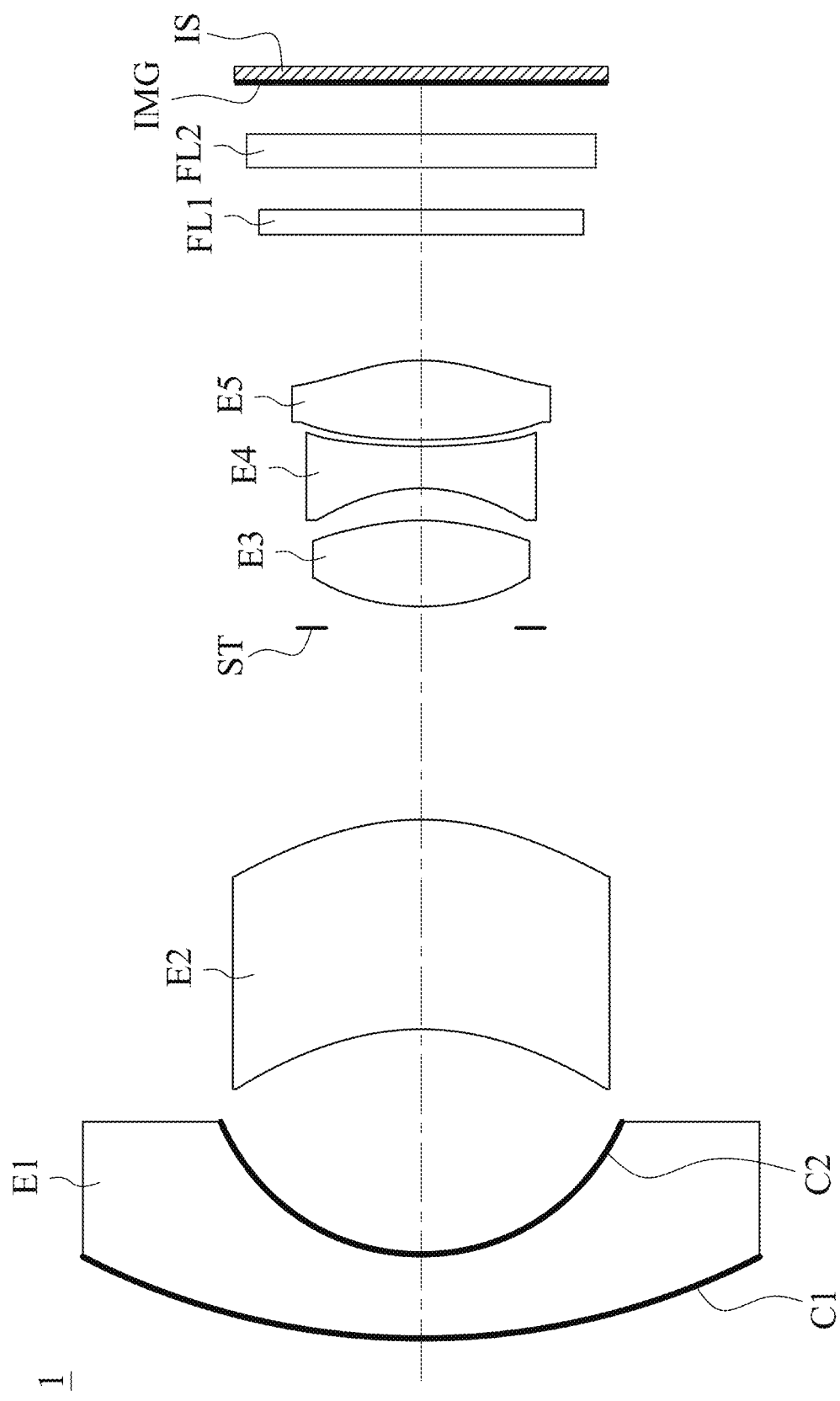
FIG. 1 is a schematic view of an imaging apparatus according to the 1st embodiment of the present disclosure.

According to one aspect of the present disclosure, an optical imaging lens assembly includes at least one optical lens element. The at least one optical lens element is made of glass, and the optical lens element includes an anti-reflective coating, and the anti-reflective coating is arranged on at least one surface of the optical lens element including the anti-reflective coating. The anti-reflective coating includes a high-low refractive coating and a gradient refractive coating, and the high-low refractive coating is arranged between the optical lens element including the anti-reflective coating and the gradient refractive coating. The high-low refractive coating includes at least one high refractive coating layer and at least one low refractive coating layer, the high refractive coating layer and the low refractive coating layer are stacked in alternations, the low refractive coating layer is in contact with the optical lens element including the anti-reflective coating, and the low refractive coating layer is mainly made of aluminum oxide. The gradient refractive coating includes a plurality of holes, the holes away from the optical lens element including the anti-reflective coating are relatively larger than the holes close to the optical lens element including the anti-reflective coating, and the gradient refractive coating is mainly made of metal oxide. When a total thickness of the anti-reflective coating at a central region of the optical lens element including the anti-reflective coating is Tc, and a total thickness of the anti-reflective coating at a peripheral region of the optical lens element including the anti-reflective coating is Tp, the following condition is satisfied: $0\% < |Tc-Tp|/Tc \leq 15.0\%$.

The multiple-layer coating technique is adopted on the optical lens element of the optical imaging lens assembly in the present disclosure. Through the plurality of high refractive coating layers and low refractive coating layers of the high-low refractive coating being stacked in alternations, the target of reducing reflection is achieved by the destructive interference of light on the surface of coating layers. Moreover, the anti-reflective effect in the wide field of wavelength region can be effectively provided because of the porous structure with gradually-changed size of the gradient refractive coating and the gradient refractive index thereof. The severe reflective problem of light at large angle can also be solved. According to the present disclosure, the uniform and compact anti-reflective coating is coated to the surface of the optical imaging lens assembly, so the optical lens element with relatively insufficient water-resistance and acid-resistance can obtain significant anti-oxidation ability. It is favorable for obtaining the anti-reflective effect in the wide field of wavelength region, and the optical imaging lens assembly in which high imaging quality is needed is satisfied.

When a total thickness of the anti-reflective coating is tTk, the following condition can be satisfied: $200 \text{ nm} \leq tTK \leq 800 \text{ nm}$. Through controlling the total thickness of the anti-reflective coating, it is favorable for maintaining the integrity of the entire coating, and the best anti-reflective effect can be obtained. Moreover, the following conditions can be satisfied: $200 \text{ nm} \leq tTK \leq 700 \text{ nm}$; $200 \text{ nm} \leq tTK \leq 600 \text{ nm}$; $200 \text{ nm} \leq tTK \leq 500 \text{ nm}$; or $300 \text{ nm} \leq tTK \leq 400 \text{ nm}$.

When a refractive index of the high refractive coating layer is NH, the following condition can be satisfied: $2.00 \leq NH$. Through controlling the refractive index of the high refractive coating layer, the larger difference between the refractive indices is provided to improve the anti-reflective effect. Moreover, the following conditions can be satisfied: $2.05 \leq NH$; $2.10 \leq NH$; $2.20 \leq NH$; or $2.30 \leq NH \leq 2.40$.

When a refractive index of the low refractive coating layer is NL, the following condition can be satisfied: $NL \leq 1.80$. Through controlling the refractive index of the low refractive coating layer, the anti-reflective effect can be effectively improved. Moreover, the following conditions can be satisfied: $1.40 \leq NL \leq 1.80$; $1.40 \leq NL \leq 1.70$; $1.45 \leq NL \leq 1.70$; or $1.45 \leq NL \leq 1.68$.

When a total thickness of the high refractive coating layer is TNH, the following condition can be satisfied: $1 \text{ nm} \leq TNH \leq 60 \text{ nm}$. Through making the high refractive coating layer reach a specific thickness, the destructive interference of reflected light can easily occur at the surface of the separated coating layers, which is favorable for enhancing the anti-reflective effect. Moreover, the following conditions can be satisfied: 1 nm≤TNH≤50 nm; 1 nm≤TNH≤40 nm; 1 nm≤TNH≤36 nm; or 1 nm≤TNH≤30 nm.

When a total thickness of the low refractive coating layer is TNL, the following condition can be satisfied: 1 nm≤TNL≤300 nm. Through making the low refractive coating layer reach a specific thickness, the destructive interference of reflected light can easily occur at the surface of the separated coating layers, which is favorable for enhancing the anti-reflective effect. Moreover, the following conditions can be satisfied: 20 nm≤TNL≤240 nm; 30 nm≤TNL≤200 nm; 40 nm≤TNL≤170 nm; or 50 nm≤TNL≤140 nm.

When a thickness of the low refractive coating layer being in contact with the optical lens element including the anti-reflective coating is TL1, the following condition can be satisfied: 10 nm≤TL1≤100 nm. Through controlling the thickness of coating layer in contact with the optical lens element, the effect of protecting the glass surface is provided, and the coating time and cost can be effectively reduced. Moreover, the following conditions can be satisfied: 1 nm≤TL1≤150 nm; 10 nm≤TL1≤120 nm; 15 nm≤TL1≤100 nm; 20 nm≤TL1≤85 nm; or 25 nm≤TL1≤70 nm. Furthermore, the coating layers of the high-low refractive coating from the optical lens element to the outer side are sequentially a first coating layer, a second coating layer, a third coating layer, a fourth coating layer, and so on. TL1 is also known as the thickness of the first coating layer.

When a thickness of the gradient refractive coating is TNG, and the total thickness of the anti-reflective coating is tTk, the following condition can be satisfied: 0.45≤TNG/tTK≤0.85. Through controlling the coating thickness of the gradient refractive coating, the best porous structure is maintained, and the best design of the gradient refractive coating is effectively obtained. Therefore, the anti-reflective effect of light at large angle is improved, which prevents the decrease of anti-reflective effect due to the insufficient coating thickness. Moreover, the following conditions can be satisfied: 0.50≤TNG/tTK≤0.80; 0.50≤TNG/tTK≤0.75; 0.60≤TNG/tTK≤0.75; or 0.60≤TNG/tTK≤0.70.

The gradient refractive coating can be made of aluminum oxide. Through selecting the suitable material for the gradient refractive coating which undergoes the pore-forming process, the pore distribution on the surface can be effectively improved and the pore separation can increase, and the best sponge-like porous structure and pore density are obtained.

When the total thickness of the anti-reflective coating at the central region of the optical lens element including the anti-reflective coating is Tc, and the total thickness of the anti-reflective coating at the peripheral region of the optical lens element including the anti-reflective coating is Tp, the following condition can be satisfied: 0%<|Tc−Tp|/Tc≤15.0%. Through maintaining the uniformity of the total thickness of the anti-reflective coating, not only the defect of generating reflected light because of the uneven coating on the peripheral region with extreme surface-shape changes can be effectively solved, but the anti-reflective effect of light incident on the surface with large angle can also be improved. Moreover, the following conditions can be satisfied: 0%<|Tc−Tp|/Tc≤10.0%; 0%<|Tc−Tp|/Tc≤5.0%; 0%<|Tc−Tp|/Tc≤1.0%; or 0%<|Tc−Tp|/Tc≤0.4%.

When a displacement in parallel with an optical axis at a maximum effective diameter position of a surface of the optical lens element including the anti-reflective coating is SAG, and the total thickness of the anti-reflective coating is tTk, the following condition can be satisfied: 0≤|SAG|/tTK≤10.0. Through controlling the conditions of coating and surface shape, it will not be limited by the parameters of the optical lens element with large curved-surface change as coated by the atomic layer deposition method. Moreover, the following conditions can be satisfied: 0≤|SAG|/tTK≤8.0; 0≤|SAG|/tTK≤6.0; 0.1≤|SAG|/tTK≤6.0; or 0.1≤|SAG|/tTK≤5.0.

When an average reflectance in a wavelength range of 400 nm-1000 nm of the optical lens element including the anti-reflective coating is R40100, the following condition can be satisfied: 0%<R40100≤1.00%. Therefore, the light reflection on the surface in the wide field of wavelength can be effectively controlled, which is favorable for increasing the transmittance in the wide field of wavelength region. Moreover, the following conditions can be satisfied: 0%<R40100≤0.80%; 0%<R40100≤0.50%; 0%<R40100≤0.25%; or 0%<R40100≤0.15%.

When an average reflectance in a wavelength range of 400 nm-700 nm of the optical lens element including the anti-reflective coating is R4070, the following condition can be satisfied: 0%<R4070≤1.00%. Therefore, the reflective effect on the surface by the light in the visible-light wavelength region can be effectively controlled, which is favorable for enhancing the transmittance in blue, green and red visible-light region. Moreover, the following conditions can be satisfied: 0%<R4070≤0.50%; 0%<R4070≤0.25%; 0%<R4070≤0.10%; or 0%<R4070≤0.05%.

When an average reflectance in a wavelength range of 700 nm-1000 nm of the optical lens element including the anti-reflective coating is R70100, the following condition can be satisfied: 0%<R70100≤1.00%. Therefore, the reflective effect on the surface by the light in the infrared wavelength region can be effectively controlled, which is favorable for enhancing the transmittance in long wavelength region. Moreover, the following conditions can be satisfied: 0%<R70100≤0.80%; 0%<R70100≤0.60%; 0%<R70100≤0.45%; or 0%<R70100≤0.25%.

When an Abbe number of the optical lens element including the anti-reflective coating is Vs, the following condition can be satisfied: 35.0≤Vs≤85.0. Through selecting the suitable glass material, it is favorable for significantly enhancing the anti-oxidizing ability of the optical lens element, and the best protective effect is provided. Moreover, the following conditions can be satisfied: 35.0≤Vs≤71.0; 35.0≤Vs≤60.0; 50.0≤Vs≤71.0; or 35.0≤Vs≤50.0.

When a refractive index of the optical lens element including the anti-reflective coating is Ns, the following condition can be satisfied: Ns≤1.85. Through controlling the refractive index of the material of the optical lens element, it is favorable for performing the best anti-reflective effect of the surface coating. Moreover, the following conditions can be satisfied: 1.45≤Ns≤1.85; 1.50≤Ns≤1.85; 1.60≤Ns≤1.85; or 1.70≤Ns≤1.85.

When an ability of acid-proof of the optical lens element including the anti-reflective coating is Da, and the Abbe number of the optical lens element including the anti-reflective coating is Vs, the following condition can be satisfied: 0.6≤Vs×Da/10≤13.0. Through arranging the Abbe number of the optical lens element, it is favorable for performing the anti-oxidizing protection of the coating layers. Moreover, the following conditions can be satisfied: 0.6≤Vs×Da/10≤10.0; 0.85≤Vs×Da/10≤8.5; 3.0≤Vs×Da/10≤13.0; or 0.9≤Vs×Da/10≤3.5.

When the ability of acid-proof of the optical lens element including the anti-reflective coating is Da, and the refractive index of the optical lens element including the anti-reflective coating is Ns, the following condition can be satisfied: 0.1≤Ns×Da≤4.5. Through arranging the refractive index of the optical lens element, it is favorable for performing the anti-oxidizing protection of the coating layers. Moreover, the following conditions can be satisfied: $0.2 \leq Ns \times Da \leq 4.1$; $0.3 \leq Ns \times Da \leq 4.0$; $0.3 \leq Ns \times Da \leq 2.5$; or $0.3 \leq Ns \times Da \leq 1.2$.

When an ability of water-proof of the optical lens element including the anti-reflective coating is Dw, and the Abbe number of the optical lens element including the anti-reflective coating is Vs, the following condition can be satisfied: $0 < Vs \times Dw \leq 10.0$. Through arranging the Abbe number of the optical lens element, it is favorable for performing the anti-oxidizing protection of the coating layers. Moreover, the following conditions can be satisfied: $0 < Vs \times Dw \leq 7.5$; $0 < Vs \times Dw \leq 6.0$; $0 < Vs \times Dw \leq 5.0$; or $0 < Vs \times Dw \leq 3.0$.

When the ability of water-proof of the optical lens element including the anti-reflective coating is Dw, and the refractive index of the optical lens element including the anti-reflective coating is Ns, the following condition can be satisfied: $0 < Ns \times Dw \times 100 \leq 50$. Through arranging the refractive index of the optical lens element, it is favorable for performing the anti-oxidizing protection of the coating layers. Moreover, the following conditions can be satisfied: $0 < Ns \times Dw \times 100 \leq 40$; $0 < Ns \times Dw \times 100 \leq 30$; $0 < Ns \times Dw \times 100 \leq 25$; or $0 < Ns \times Dw \times 100 \leq 17$.

The aforementioned optical imaging lens assembly can further include at least one optical element. The optical element can be made of glass. The optical element can include an anti-reflective coating, the anti-reflective coating of the optical element can be arranged on at least one surface of the optical element including the anti-reflective coating, and the optical element including the anti-reflective coating can be a prism. Through arranging the anti-reflective coating, the loss of light passing through the prism can be effectively reduced.

According to another aspect of the present disclosure, an optical imaging lens assembly includes at least two optical lens elements and at least one optical element. At least one of the optical lens elements includes a long-wavelength absorbing material, the optical lens element including the long-wavelength absorbing material is made of a plastic material, and the long-wavelength absorbing material is evenly mixed with the plastic material. At least one of the optical lens elements includes a long-wavelength filtering coating, the long-wavelength filtering coating is arranged on an object-side surface or an image-side surface of the optical lens element including the long-wavelength filtering coating, the long-wavelength filtering coating includes a plurality of high refractive coating layers and a plurality of low refractive coating layers, and the high refractive coating layers of the long-wavelength filtering coating and the low refractive coating layers of the long-wavelength filtering coating are stacked in alternations. The optical element is made of glass, the optical element includes an anti-reflective coating, the anti-reflective coating of the optical element is arranged on at least one surface of the optical element including the anti-reflective coating, and the optical element including the anti-reflective coating is a planar lens element. The anti-reflective coating of the optical element includes a high-low refractive coating and a gradient refractive coating, and the high-low refractive coating is arranged between the optical element including the anti-reflective coating and the gradient refractive coating. The high-low refractive coating includes at least one high refractive coating layer and at least one low refractive coating layer, the high refractive coating layer of the high-low refractive coating and the low refractive coating layer of the high-low refractive coating are stacked in alternations, the low refractive coating layer of the high-low refractive coating is in contact with the optical element including the anti-reflective coating, and the low refractive coating layer of the high-low refractive coating is mainly made of aluminum oxide. The gradient refractive coating includes a plurality of holes, the holes away from the optical element including the anti-reflective coating are relatively larger than the holes close to the optical element including the anti-reflective coating, and the gradient refractive coating is mainly made of metal oxide.

Therefore, the optical imaging lens assembly provided by the present disclosure has the effects of reducing the blue glass elements and the infrared filtering elements, and effectively preventing the stray lights with petal shapes caused by the reflection between the surface of micro lens and the surface of protective glass.

According to one another aspect of the present disclosure, an imaging apparatus includes the aforementioned optical imaging lens assembly and an image sensor. The image sensor is disposed on an image surface of the optical imaging lens assembly.

According to still another aspect of the present disclosure, an electronic device, which is a vehicle device or a mobile device, includes the aforementioned imaging apparatus.

When a field of view of the optical imaging lens assembly is FOV, the following conditions can be satisfied: 15 degrees $\leq$ FOV $\leq$ 180 degrees; 30 degrees $\leq$ FOV $\leq$ 150 degrees; or 35 degrees $\leq$ FOV $\leq$ 120 degrees.

When an axial distance between the object-side surface of the first lens element and the image-side surface of the last lens element in the optical imaging lens assembly is TD, the following conditions can be satisfied: 5 mm $\leq$ TD $\leq$ 30 mm; 5 mm $\leq$ TD $\leq$ 25 mm; or 10 mm $\leq$ TD $\leq$ 20 mm.

When the displacement in parallel with the optical axis at the maximum effective diameter position of the surface of the optical lens element including the anti-reflective coating is SAG, the following conditions can be satisfied: 0 mm $\leq$ |SAG| $\leq$ 8.00 mm; 0 mm $\leq$ |SAG| $\leq$ 5.60 mm; 0 mm $\leq$ |SAG| $\leq$ 3.60 mm; 0.02 mm $\leq$ |SAG| $\leq$ 3.00 mm; or 0.03 mm $\leq$ |SAG| $\leq$ 2.00 mm.

When a maximum of effective diameter positions of all the surfaces of the optical lens elements is SDmax, the following conditions can be satisfied: 1 mm $\leq$ SDmax $\leq$ 20 mm; 1 mm $\leq$ SDmax $\leq$ 15 mm; or 3 mm $\leq$ SDmax $\leq$ 13 mm.

When a central thickness of the optical lens element including the anti-reflective coating is CT, the following conditions can be satisfied: 0.5 mm $\leq$ CT $\leq$ 6.0 mm; 0.5 mm $\leq$ CT $\leq$ 4.0 mm; or 0.7 mm $\leq$ CT $\leq$ 2.0 mm.

When a water-proof rank of the optical lens element including the anti-reflective coating is RW, the following conditions can be satisfied: $1 \leq RW \leq 6$; $1 \leq RW \leq 5$; or $1 \leq RW \leq 3$.

When an acid-proof rank of the optical lens element including the anti-reflective coating is RA, the following conditions can be satisfied: $1 \leq RA \leq 6$; $2 \leq RA \leq 6$; or $3 \leq RA \leq 6$.

The coating layers of the high-low refractive coating from the optical lens element to the outer side are sequentially the first coating layer, the second coating layer, the third coating layer, the fourth coating layer, and so on. When a thickness of the second coating layer is TL2, the following conditions can be satisfied: 1 nm $\leq$ TL2 $\leq$ 30 nm; 1 nm $\leq$ TL2 $\leq$ 25 nm; 1 nm $\leq$ TL2 $\leq$ 20 nm; 1 nm $\leq$ TL2 $\leq$ 18 nm; or 1 nm $\leq$ TL2 $\leq$ 15 nm.

When a thickness of the third coating layer is TL3, the following conditions can be satisfied: 1 nm $\leq$ TL3 $\leq$ 150 nm; 10 nm $\leq$ TL3 $\leq$ 120 nm; 15 nm $\leq$ TL3 $\leq$ 100 nm; 20 nm $\leq$ TL3 $\leq$ 85 nm; or 25 nm $\leq$ TL3 $\leq$ 70 nm.

When a thickness of the fourth coating layer is TL4, the following conditions can be satisfied: 1 nm≤TL4≤30 nm; 1 nm≤TL4≤25 nm; 1 nm≤TL4≤20 nm; 1 nm≤TL4≤18 nm; or 1 nm≤TL4≤15 nm.

When the thickness of the gradient refractive coating is TNG, the following conditions can be satisfied: 90 nm≤TNG≤680 nm; 100 nm≤TNG≤560 nm; 100 nm≤TNG≤450 nm; 120 nm≤TNG≤375 nm; or 180 nm≤TNG≤280 nm.

When an average reflectance in a wavelength range of 400 nm-600 nm of the optical lens element including the anti-reflective coating is R4060, the following conditions can be satisfied: 0%<R4060≤1.00%; 0%<R4060≤0.50%; 0%<R4060≤0.25%; 0%<R4060≤0.10%; or 0%<R4060≤0.05%.

When an average reflectance in a wavelength range of 500 nm-600 nm of the optical lens element including the anti-reflective coating is R5060, the following conditions can be satisfied: 0%<R5060≤1.00%; 0%<R5060≤0.50%; 0%<R5060≤0.25%; 0%<R5060≤0.10%; or 0%<R5060≤0.05%.

When an average reflectance in a wavelength range of 500 nm-700 nm of the optical lens element including the anti-reflective coating is R5070, the following conditions can be satisfied: 0%<R5070≤1.00%; 0%<R5070≤0.50%; 0%<R5070≤0.25%; 0%<R5070≤0.10%; or 0%<R5070≤0.05%.

When an average reflectance in a wavelength range of 800 nm-1000 nm of the optical lens element including the anti-reflective coating is R80100, the following conditions can be satisfied: 0%<R80100≤1.00%; 0%<R80100≤0.85%; 0%<R80100≤0.70%; 0%<R80100≤0.50%; or 0%<R80100≤0.35%.

When an average reflectance in a wavelength range of 900 nm-1000 nm of the optical lens element including the anti-reflective coating is R90100, the following conditions can be satisfied: 0%<R90100≤1.00%; 0%<R90100≤0.90%; 0%<R90100≤0.75%; 0%<R90100≤0.60%; or 0%<R90100≤0.50%.

The reflectance in the present disclosure is measured from single optical lens element, and the data at the incident angle of 0 degrees and 30 degrees is chosen to be the basis for the comparison of reflectance.

The phrase "mainly made of (material)" in the present disclosure means that the weight ratio of the aforementioned material is at least 50% of the whole.

According to the present disclosure, an optical imaging lens assembly includes at least two optical lens elements and at least one optical element. The optical element can be arranged on an object side or an image side of the at least two optical lens elements, or be arranged between the at least two optical lens elements.

According to the present disclosure, the glass material can be a glass containing high alkali metal oxides, a glass containing high silicon oxides, or a special glass containing fluorides and phosphates, which provides the best anti-oxidizing effects. The glass material with great water-resistance and acid-resistance can be chosen as the coating substrate, which provides better anti-oxidizing effects.

According to the present disclosure, the testing method of the acid-proof values of the optical lens elements is based on the GB/T 171292 testing method. A specific proportion of weight of the powdered glass with the particle diameter of 425 μm-600 μm is add into a water solution of nitric acid with a molar concentration of 0.01 mol/L. The decreased mass percentages (%) thereof are taken as the acid-proof values of the optical lens elements, which are divided into 6 levels.

According to the present disclosure, the testing method of the water-proof values of the optical lens elements is based on the GB/T 171292 testing method. A specific proportion of weight of the powdered glass with the particle diameter of 425 μm-600 μm is add into 80 ml water (pH 6.5-7.5) and boiled for 60 minutes. The decreased mass percentages (%) thereof are taken as the water-proof values of the optical lens elements, which are divided into 6 levels.

The anti-reflective coating of the present disclosure can be made by coating a plurality of coating layers on the surface of glass. Physical vapor deposition (PVD) can be adopted, such as evaporative deposition or sputtering deposition, or chemical vapor deposition (CVD) can be adopted, such as ultra-high vacuum chemical vapor deposition, microwave plasma-enhanced chemical vapor deposition, plasma-enhanced chemical vapor deposition or atomic layer deposition (ALD).

According to the present disclosure, the optical lens element can include the anti-reflective coatings on the both surfaces thereof, but the anti-reflective coating can also be manufactured only on one suitable surface thereof. By adopting the technique of the present disclosure to the surfaces of the optical lens elements which have extreme surface-shape changes, the anti-reflective coatings manufactured by the atomic layer deposition method will have optimal values. The balance between the cost and the quality can be achieved. Also, by manufacturing the anti-reflective coatings on the material of optical lens elements having the most suitable refractive index, the best anti-reflective effect can be obtained.

The pore distribution on the surface of the optical lens element can be effectively improved by the surface pore-forming process. Therefore, the distance between the pores on the surface of the optical lens element can increase, the pore structure can be sponge-like or the density of pores can be changed. The pore-forming effect can also change along the depth of the anti-reflective coating. For example, the outer side of the anti-reflective coating in contact with the air has larger pore structure, while the deeper inner side thereof has relatively smaller pore structure. The aforementioned pores are made of the spaces between the irregular nanofiber structures, and the air can stay or communicate between the pores. The outer side and inner side of the anti-reflective coating are that, in the sectional views, the outer side is the side of the anti-reflective coating away from the optical lens element, and the inner side is the side of the anti-reflective coating closer to the optical lens element. The pores (notches, holes) at the outer side are relatively larger than those at the inner side, which also means that the irregular branch-like structure distributes with a lower density at the outer side of a plane, and the irregular branch-like structure distributes with a higher density at the inner side of the same plane. The surface pore-forming process can be achieved by plasma etching, chemical etching, time-controlling crystalline size technique, or high-temperature solution treatment, such as immersion in alcohol or water over 50 degrees.

According to the present disclosure, the gradient refractive coating is mainly made of metal oxides, which can be aluminum oxide, or can be aluminum nitride (AlN), aluminum hydroxide (Al(OH)$_3$) or mixture with aluminum.

According to the present disclosure, the high-low refractive coating can further include extra coating layers between the high refractive coating layer and the low refractive coating layer. Through the arrangement and design of the coatings, it can provide the coating layers with the refractive indices having gradient changes. The difference between the high refractive index and the low refractive index can also be satisfied to meet the goal of reducing reflected lights by the destructive interference, which can effectively improve the anti-reflective effect in the wide field of wavelength region.

According to the present disclosure, the gradient changes can be a polynomial function (including a linear function and a curve function) or a Gauss function of the refractive index and the location, or the combination thereof.

According to the present disclosure, the high refractive coating layer or the low refractive coating layer can be the coating layer in contact with the optical lens element or the optical element. The high refractive coating layer or the low refractive coating layer can be mainly made of aluminum oxide, or can be aluminum nitride, aluminum hydroxide or mixture with aluminum; or can be zinc oxide or magnesium oxide; or can be a mixture of at least one of the aforementioned aluminum oxide, zinc oxide, magnesium oxide and other metal oxides. The material has the property of compact structure, so as to enhance the adhesion between the material and the optical lens element and prevent the coating from peeling off. Thus, the protection of the surface of the optical lens element in the coating process can be obtained and the environmental weather resistance of the optical lens element is effectively improved.

The refractive index of the material of the high refractive coating layers in the anti-reflective coating in the present disclosure can be greater than 2.0, and the refractive index of the material of the low refractive coating layers in the anti-reflective coating can be smaller than 1.8. For example, the materials of the high refractive coating layers and the low refractive coating layers (refractive index at the wavelength of 587.6 nm) can respectively be: magnesium fluoride ($MgF_2$, 1.3777), silicon dioxide ($SiO_2$, 1.4585), thorium tetrafluoride ($ThF_4$, 1.5125), silicon monoxide (SiO, 1.55), cerium trifluoride ($CeF_3$, 1.63), aluminum oxide ($Al_2O_3$, 1.7682), yttrium oxide ($Y_2O_3$, 1.79), hafnium dioxide ($HfO_2$, 1.8935), zinc oxide (ZnO, 1.9269), scandium oxide ($Sc_2O_3$, 1.9872), aluminum nitride (AlN, 2.0294), silicon nitride ($Si_3N_4$, 2.0381), tantalum pentoxide ($Ta_2O_5$, 2.1306), zirconium dioxide ($ZrO_2$, 2.1588), zinc sulfide (ZnS, 2.2719), niobium pentoxide ($Nb_2O_5$, 2.3403), titanium dioxide ($TiO_2$, 2.6142) or titanium nitride (TiN, 3.1307). The materials of the anti-reflective coatings can also be the mixture of magnesium fluoride-silicon dioxide ($MgF_2$—$SiO_2$), and the ratio of each composition thereof can be $[SiO_2]>[MgF_2]$.

According to the present disclosure, the electronic device can also be a vehicle device, a mobile device, an aviation device or a monitoring device.

According to the present disclosure, an electronic device is provided, wherein the electronic device includes the imaging apparatus of the aforementioned aspect. Therefore, it is favorable for enhancing the image quality. Preferably, the electronic device can further include, but not limited to, a control unit, a display unit, a storage unit, a random access memory unit (RAM) or a combination thereof.

According to the present disclosure, the optical imaging lens assembly can be utilized in 3D (three-dimensional) image capturing applications, in products such as digital cameras, mobile devices, digital tablets, smart TVs, surveillance systems, motion sensing input devices, driving recording systems, rearview camera systems, wearable devices, or unmanned aerial vehicles.

The image can be captured by the imaging apparatus through a non-circular opening corresponding to the outer side of the electronic device.

According to the above description of the present disclosure, the following specific embodiment is provided for further explanation.

1st Embodiment

Please refer to FIG. 1. FIG. 1 is a schematic view of an imaging apparatus 1 according to the 1st embodiment of the present disclosure. In FIG. 1, the imaging apparatus 1 according to the 1st embodiment includes an optical imaging lens assembly (its reference number is omitted) and an image sensor IS. The optical imaging lens assembly includes, in order from an object side to an image side along an optical path, an optical lens element E1, an optical lens element E2, an aperture stop ST, an optical lens element E3, an optical lens element E4, an optical lens element E5, a filter FL1, a filter FL2 and an image surface IMG, wherein the image sensor IS is disposed on the image surface IMG of the optical imaging lens assembly. The optical imaging lens assembly includes five optical lens elements (E1, E2, E3, E4, E5) without additional one or more optical lens elements inserted between the optical lens element E1 and the optical lens element E5. There is an air gap in a paraxial region between each of adjacent optical lens elements of the five optical lens elements.

Each of the five optical lens elements includes an object-side surface and an image-side surface. The optical lens element E1 is made of glass, and the optical lens element E1 includes two anti-reflective coatings C1, C2. The two anti-reflective coatings C1, C2 are arranged on the object-side surface and the image-side surface of the optical lens element E1, respectively. The optical lens element E2, the optical lens element E3, the optical lens element E4, and the optical lens element E5 are made of plastic.

When a field of view of the imaging apparatus 1 is FOV, the following condition is satisfied: FOV=124 degrees. When an axial distance between the object-side surface of the optical lens element E1 and the image-side surface of the optical lens element E5 is TD, the following condition is satisfied: TD=12 mm. When a displacement in parallel with an optical axis at a maximum effective diameter position of the object-side surfaces and the image-side surfaces of the optical lens element E1, the optical lens element E2, the optical lens element E3, the optical lens element E4, and the optical lens element E5 is SAG, the following condition is satisfied: 0.98 mm≤|SAG|≤1.59 mm. A maximum of effective diameter positions of all the surfaces of the optical lens elements is SDmax. In the 1st embodiment, SDmax is the effective diameter position of the object-side surface of the optical lens element E1, and the following condition is satisfied: SDmax=8 mm.

When a central thickness of the optical lens element E1 is CT, the following condition is satisfied: CT=1.0 mm. When a refractive index of the optical lens element E1 is Ns, the following condition is satisfied: Ns=1.80. When an Abbe number of the optical lens element E1 is Vs, the following condition is satisfied: Vs=46.5. When a water-proof rank of the optical lens element E1 is RW, the following condition is satisfied: RW=1. When an ability of water-proof of the optical lens element E1 is Dw, the following condition is satisfied: Dw≤0.05. When an acid-proof rank of the optical lens element E1 is RA, the following condition is satisfied:

RA=4. When the ability of acid-proof of the optical lens element E1 is Da, the following condition is satisfied: 0.65≤Da≤1.20.

When the ability of water-proof of the optical lens element E1 is Dw, and the refractive index of the optical lens element E1 is Ns, the following condition is satisfied: Ns×Dw×100≤9. When the ability of acid-proof of the optical lens element E1 is Da, and the refractive index of the optical lens element E1 is Ns, the following condition is satisfied: 1.2≤Ns×Da≤2.2. When the ability of water-proof of the optical lens element E1 is Dw, and the Abbe number of the optical lens element E1 is Vs, the following condition is satisfied: Vs×Dw≤2.3. When the ability of acid-proof of the optical lens element E1 is Da, and the Abbe number of the optical lens element E1 is Vs, the following condition is satisfied: 3.0≤Vs×Da/10≤5.6.

When the displacement in parallel with the optical axis at the maximum effective diameter position of the object-side surface of the optical lens element E1 is SAG, the following condition is satisfied: |SAG|=0.98 mm. When the effective diameter position of the object-side surface of the optical lens element E1 is SD, the following condition is satisfied: |SD|×2=8.08. When the displacement in parallel with the optical axis at the maximum effective diameter position of the image-side surface of the optical lens element E1 is SAG, the following condition is satisfied: |SAG|=1.59 mm. When the effective diameter position of the image-side surface of the optical lens element E1 is SD, the following condition is satisfied: |SD|×2=4.79.

The detailed optical data of the imaging apparatus 1 of the 1st embodiment is shown in Table 1, wherein "1G4P" of the optical lens element composition means that the imaging apparatus 1 of the 1st embodiment includes one optical lens element made of the glass material and four optical lens elements made of the plastic material.

TABLE 1

| Optical Lens Element Composition | | 1G4P | |
|---|---|---|---|
| Optical Lens Element Made of Molded Glass | | N/A | |
| FOV (degree) | | 124 | |
| TD (mm) | | 12 | |
| SDmax (mm) | | 8 | |
| | | Object-Side Surface of E1 | |
| | | E1 | |
| CT (mm) | | 1.0 | |
| Ns | | 1.80 | |
| Vs | | 46.5 | |
| Material (Glass/ Molded Glass/Plastic) | | Glass | |
| RW | | 1 | |
| Dw (Lower Limit/ Upper Limit) | | | 0.05 |
| RA | | 4 | |
| Da (Lower Limit/ Upper Limit) | 0.65 | | 1.20 |
| Ns × Dw × 100 | | 9 | |
| Ns × Da | 1.2 | | 2.2 |
| Vs × Dw | | 2.3 | |
| Vs × Da/10 | 3.0 | | 5.6 |
| Object-Side Surface | |SAG| | 0.98 | |
| | |SD| × 2 | 8.08 | |
| Image-Side Surface | |SAG| | 1.59 | |
| | |SD| × 2 | 4.79 | |

2nd Embodiment

The imaging apparatus according to the 2nd embodiment includes an optical imaging lens assembly and an image sensor. The optical imaging lens assembly includes, in order from an object side to an image side along an optical path, an optical lens element E1, an optical lens element E2, an optical lens element E3, an optical lens element E4, an optical lens element E5, an optical lens element E6, an optical lens element E7 and an image surface, wherein the image sensor is disposed on the image surface of the optical imaging lens assembly. The optical imaging lens assembly includes seven optical lens elements (E1, E2, E3, E4, E5, E6, E7) without additional one or more optical lens elements inserted between the optical lens element E1 and the optical lens element E7. There is an air gap in a paraxial region between each of adjacent optical lens elements of the seven optical lens elements.

Each of the seven optical lens elements includes an object-side surface and an image-side surface. The optical lens element E1 is made of molded glass, and the optical lens element E1 includes an anti-reflective coating. The anti-reflective coating is arranged on at least one surface of the object-side surface and the image-side surface of the optical lens element E1. The optical lens element E2, the optical lens element E3, the optical lens element E4, the optical lens element E5, the optical lens element E6, and the optical lens element E7 are made of plastic.

The detailed optical data of the imaging apparatus of the 2nd embodiment is shown in Table 2, wherein "1MG6P" of the optical lens element composition means that the imaging apparatus of the 2nd embodiment includes one optical lens element made of the molded glass material and six optical lens elements made of the plastic material. The definitions of these parameters shown in the following table are the same as those stated in the 1st embodiment with corresponding values for the 2nd embodiment, so an explanation in this regard will not be provided again.

TABLE 2

| Optical Lens Element Composition | | 1MG6P | |
|---|---|---|---|
| Optical Lens Element Made of Molded Glass | | E1 | |
| FOV (degree) | | 80 | |
| TD (mm) | | 6 | |
| SDmax (mm) | | 4 | |
| | | Object-Side Surface of E1 | |
| | | E1 | |
| CT (mm) | | 1.1 | |
| Ns | | 1.59 | |
| Vs | | 67.0 | |
| Material (Glass/ Molded Glass/Plastic) | | Molded Glass | |
| RW | | 1 | |
| Dw (Lower Limit/ Upper Limit) | | | 0.05 |
| RA | | 4 | |
| Da (Lower Limit/ Upper Limit) | 0.65 | | 1.20 |
| Ns×Dw×100 | | | 8 |
| Ns×Da | 1.0 | | 1.9 |
| Vs×Dw | | | 3.4 |
| Vs×Da/10 | 4.4 | | 8.0 |
| Object-Side Surface | |SAG| | 0.91 | |
| | |SD| × 2 | 3.70 | |
| Image-Side Surface | |SAG| | 0.21 | |
| | |SD| × 2 | 3.37 | |

3rd Embodiment

The imaging apparatus according to the 3rd embodiment includes an optical imaging lens assembly and an image sensor. The optical imaging lens assembly includes, in order from an object side to an image side along an optical path, an optical lens element E1, an optical lens element E2, an optical lens element E3, an optical lens element E4, an optical lens element E5, an optical lens element E6 and an image surface, wherein the image sensor is disposed on the image surface of the optical imaging lens assembly. The optical imaging lens assembly includes six optical lens elements (E1, E2, E3, E4, E5, E6) without additional one or more optical lens elements inserted between the optical lens element E1 and the optical lens element E6. There is an air gap in a paraxial region between each of adjacent optical lens elements of the six optical lens elements.

Each of the six optical lens elements includes an object-side surface and an image-side surface. The optical lens element E3 is made of glass, and the optical lens element E3 includes an anti-reflective coating. The anti-reflective coating is arranged on at least one surface of the object-side surface and the image-side surface of the optical lens element E3. The optical lens element E1, the optical lens element E2, the optical lens element E4, the optical lens element E5, and the optical lens element E6 are made of plastic.

The detailed optical data of the imaging apparatus of the 3rd embodiment is shown in Table 3. The definitions of these parameters shown in the following table are the same as those stated in the 1st embodiment with corresponding values for the 3rd embodiment, so an explanation in this regard will not be provided again.

TABLE 3

| Optical Lens Element Composition | 1G5P | |
|---|---|---|
| Optical Lens Element Made of Molded Glass | N/A | |
| FOV (degree) | 20 | |
| TD (mm) | 7 | |
| SDmax (mm) | 3 | |
| | Object-Side Surface of E3 | |
| | E3 | |
| CT (mm) | 1.0 | |
| Ns | 1.49 | |
| Vs | 70.4 | |
| Material (Glass/ Molded Glass/Plastic) | Glass | |
| RW | 2 | |
| Dw (Lower Limit/ Upper Limit) | 0.05 | 0.10 |
| RA | 4 | |
| Da (Lower Limit/ Upper Limit) | 0.65 | 1.20 |
| Ns × Dw × 100 | 7 | 15 |
| Ns × Da | 1.0 | 1.8 |
| Vs × Dw | 3.5 | 7.0 |
| Vs × Da/10 | 4.6 | 8.5 |
| Object-Side Surface | \|SAG\| | | 0.27 |
| | \|SD\| × 2 | 3.03 |
| Image-Side Surface | \|SAG\| | | 0.05 |
| | \|SD\| × 2 | 2.79 |

4th Embodiment

The imaging apparatus according to the 4th embodiment includes an optical imaging lens assembly and an image sensor. The optical imaging lens assembly includes, in order from an object side to an image side along an optical path, an optical lens element E1, an optical lens element E2, an optical lens element E3, an optical lens element E4, an optical lens element E5, an optical lens element E6, an optical lens element E7 and an image surface, wherein the image sensor is disposed on the image surface of the optical imaging lens assembly. The optical imaging lens assembly includes seven optical lens elements (E1, E2, E3, E4, E5, E6, E7) without additional one or more optical lens elements inserted between the optical lens element E1 and the optical lens element E7. There is an air gap in a paraxial region between each of adjacent optical lens elements of the seven optical lens elements.

Each of the seven optical lens elements includes an object-side surface and an image-side surface. The optical lens element E4 is made of glass, and the optical lens element E4 includes an anti-reflective coating. The anti-reflective coating is arranged on at least one surface of the object-side surface and the image-side surface of the optical lens element E4. The optical lens element E1, the optical lens element E2, the optical lens element E3, the optical lens element E5, the optical lens element E6, and the optical lens element E7 are made of plastic.

The detailed optical data of the imaging apparatus of the 4th embodiment is shown in Table 4. The definitions of these parameters shown in the following table are the same as those stated in the 1st embodiment with corresponding values for the 4th embodiment, so an explanation in this regard will not be provided again.

TABLE 4

| Optical Lens Element Composition | 1G6P | |
|---|---|---|
| Optical Lens Element Made of Molded Glass | N/A | |
| FOV (degree) | 36 | |
| TD (mm) | 24 | |
| SDmax (mm) | 7 | |
| | Object-Side Surface of E4 | |
| | E4 | |
| CT (mm) | 1.5 | |
| Ns | 1.52 | |
| Vs | 64.2 | |
| Material (Glass/ Molded Glass/Plastic) | Glass | |
| RW | 3 | |
| Dw (Lower Limit/ Upper Limit) | 0.10 | 0.25 |
| RA | 1 | |
| Da (Lower Limit/ Upper Limit) | | 0.20 |
| Ns × Dw × 100 | 15 | 38 |
| Ns × Da | | 0.3 |
| Vs × Dw | 6.4 | 16.1 |
| Vs × Da/10 | | 1.3 |
| Object-Side Surface | \|SAG\| | | 0.11 |
| | \|SD\| × 2 | 7.13 |
| Image-Side Surface | \|SAG\| | | 0.79 |
| | \|SD\| × 2 | 7.00 |

5th Embodiment

The imaging apparatus according to the 5th embodiment includes an optical imaging lens assembly and an image sensor. The optical imaging lens assembly includes, in order from an object side to an image side along an optical path, an optical lens element E1, an optical lens element E2, an optical lens element E3, an optical lens element E4, an optical lens element E5, an optical lens element E6, an optical lens element E7, an optical lens element E8, an optical lens element E9 and an image surface, wherein the image sensor is disposed on the image surface of the optical imaging lens assembly. The optical imaging lens assembly includes nine optical lens elements (E1, E2, E3, E4, E5, E6, E7, E8, E9) without additional one or more optical lens elements inserted between the optical lens element E1 and the optical lens element E9. There is an air gap in a paraxial region between each of adjacent optical lens elements of the nine optical lens elements.

Each of the nine optical lens elements includes an object-side surface and an image-side surface. The optical lens element E4 is made of glass, and the optical lens element E4 includes an anti-reflective coating. The anti-reflective coating is arranged on at least one surface of the object-side surface and the image-side surface of the optical lens element E4. The optical lens element E1, the optical lens element E2, the optical lens element E3, the optical lens element E5, the optical lens element E6, the optical lens element E7, the optical lens element E8, and the optical lens element E9 are made of plastic.

The detailed optical data of the imaging apparatus of the 5th embodiment is shown in Table 5. The definitions of these parameters shown in the following table are the same as those stated in the 1st embodiment with corresponding values for the 5th embodiment, so an explanation in this regard will not be provided again.

TABLE 5

| Optical Lens Element Composition | 1G8P | |
|---|---|---|
| Optical Lens Element Made of Molded Glass | N/A | |
| FOV (degree) | 32 | |
| TD (mm) | 22 | |
| SDmax (mm) | 6 | |
| | Object-Side Surface of E4 | |
| | E4 | |
| CT (mm) | 1.4 | |
| Ns | 1.52 | |
| Vs | 64.2 | |
| Material (Glass/Molded Glass/Plastic) | Glass | |
| RW | 3 | |
| Dw (Lower Limit/Upper Limit) | 0.10 | 0.25 |
| RA | 1 | |
| Da (Lower Limit/Upper Limit) | | 0.20 |
| Ns × Dw ×100 | 15 | 38 |
| Ns × Da | | 0.3 |
| Vs × Dw | 6.4 | 16.1 |
| Vs × Da/10 | | 1.3 |
| Object-Side Surface |SAG| | 0.48 | |
| |SD| × 2 | 6.32 | |
| Image-Side Surface |SAG| | 0.19 | |
| |SD| × 2 | 6.00 | |

6th Embodiment

The imaging apparatus according to the 6th embodiment includes an optical imaging lens assembly and an image sensor. The optical imaging lens assembly includes, in order from an object side to an image side along an optical path, an optical lens element E1, an optical lens element E2, an optical lens element E3, an optical lens element E4, an optical lens element E5, an optical lens element E6 and an image surface, wherein the image sensor is disposed on the image surface of the optical imaging lens assembly. The optical imaging lens assembly includes six optical lens elements (E1, E2, E3, E4, E5, E6) without additional one or more optical lens elements inserted between the optical lens element E1 and the optical lens element E6. There is an air gap in a paraxial region between each of adjacent optical lens elements of the six optical lens elements.

Each of the six optical lens elements includes an object-side surface and an image-side surface. The optical lens element E1 and the optical lens element E2 are made of glass, and each of the optical lens element E1 and the optical lens element E2 includes an anti-reflective coating. Each of the anti-reflective coatings is arranged on at least one surface of the object-side surface and the image-side surface of the optical lens element E1 and the optical lens element E2. The optical lens element E3, the optical lens element E4, the optical lens element E5, and the optical lens element E6 are made of plastic.

The detailed optical data of the imaging apparatus of the 6th embodiment is shown in Table 6. The definitions of these parameters shown in the following table are the same as those stated in the 1st embodiment with corresponding values for the 6th embodiment, so an explanation in this regard will not be provided again.

TABLE 6

| Optical Lens Element Composition | 2G4P | | | |
|---|---|---|---|---|
| Optical Lens Element Made of Molded Glass | N/A | | | |
| FOV (degree) | 80 | | | |
| TD (mm) | 9 | | | |
| SDmax (mm) | 5 | | | |
| | Object-Side Surface of E1 | | | |
| | E1 | | E2 | |
| CT (mm) | 0.6 | | 2.6 | |
| Ns | 1.83 | | 1.81 | |
| Vs | 37.2 | | 40.9 | |
| Material (Glass/Molded Glass/Plastic) | Glass | | Glass | |
| RW | 1 | | 1 | |
| Dw (Lower Limit/Upper Limit) | | 0.05 | | 0.05 |
| RA | 3 | | 3 | |
| Da (Lower Limit/Upper Limit) | 0.35 | 0.65 | 0.35 | 0.65 |
| Ns × Dw × 100 | | 9 | | 9 |
| Ns × Da | 0.6 | 1.2 | 0.6 | 1.2 |
| Vs × Dw | | 1.9 | | 2.1 |
| Vs × Da/10 | 1.3 | 2.4 | 1.4 | 2.7 |
| Object-Side Surface |SAG| | | 0.99 | | 0.37 |
| |SD| × 2 | | 5.47 | | 3.86 |
| Image-Side Surface |SAG| | | 1.11 | | 0.04 |
| |SD| × 2 | | 4.27 | | 1.88 |

7th Embodiment

The imaging apparatus according to the 7th embodiment includes an optical imaging lens assembly and an image sensor. The optical imaging lens assembly includes, in order from an object side to an image side along an optical path, an optical lens element E1, an optical lens element E2, an optical lens element E3, an optical lens element E4, an optical lens element E5, an optical lens element E6 and an image surface, wherein the image sensor is disposed on the image surface of the optical imaging lens assembly. The optical imaging lens assembly includes six optical lens elements (E1, E2, E3, E4, E5, E6) without additional one or more optical lens elements inserted between the optical lens element E1 and the optical lens element E6. There is an air gap in a paraxial region between each of adjacent optical lens elements of the six optical lens elements.

Each of the six optical lens elements includes an object-side surface and an image-side surface. The optical lens element E1, the optical lens element E2, the optical lens element E3, the optical lens element E4, the optical lens element E5, and the optical lens element E6 are made of glass, and each of the optical lens element E1, the optical lens element E2, the optical lens element E3, the optical lens element E4, the optical lens element E5, and the optical lens element E6 includes an anti-reflective coating. Each of the anti-reflective coatings is arranged on at least one surface of the object-side surface and the image-side surface of the optical lens element E1, the optical lens element E2, the optical lens element E3, the optical lens element E4, the optical lens element E5, and the optical lens element E6.

The detailed optical data of the imaging apparatus of the 7th embodiment is shown in Table 7. The definitions of these parameters shown in the following table are the same as those stated in the 1st embodiment with corresponding values for the 7th embodiment, so an explanation in this regard will not be provided again.

TABLE 7

| Optical Lens Element Composition | | 6G | | |
|---|---|---|---|---|
| Optical Lens Element Made of Molded Glass | | N/A | | |
| FOV (degree) | | 58 | | |
| TD (mm) | | 17 | | |
| SDmax (mm) | | 8 | | |

| | Object-Side Surface of E1 | | | |
|---|---|---|---|---|
| | E1 | E2 | E3 | |
| CT (mm) | 1.1 | 2.8 | 1.6 | |
| Ns | 1.78 | 1.92 | 1.80 | |
| Vs | 25.7 | 18.9 | 46.6 | |
| Material (Glass/Molded Glass/Plastic) | Glass | Glass | Glass | |
| RW | 1 | 1 | 1 | |
| Dw (Lower Limit/Upper Limit) | 0.05 | 0.05 | 0.05 | |
| RA | 1 | 1 | 3 | |
| Da (Lower Limit/Upper Limit) | 0.20 | 0.20 | 0.35 0.65 | |
| Ns × Dw × 100 | 9 | 10 | 9 | |
| Ns × Da | 0.4 | 0.4 | 0.6 1.2 | |
| Vs × Dw | 1.3 | 1.0 | 2.3 | |
| Vs × Da/10 | 0.5 | 0.4 | 1.6 3.0 | |
| Object-Side Surface |SAG| | 1.41 | 1.09 | 0.29 | |
| |SD| × 2 | 8.33 | 6.32 | 4.42 | |
| Image-Side Surface |SAG| | 1.87 | 0.75 | 0.05 | |
| |SD| × 2 | 6.34 | 4.44 | 3.98 | |

| | E4 | E5 | E6 | |
|---|---|---|---|---|
| CT (mm) | 3.1 | 4.5 | 0.8 | |
| Ns | 1.80 | 1.77 | 1.85 | |
| Vs | 46.6 | 49.6 | 23.8 | |
| Material (Glass/Molded Glass/Plastic) | Glass | Glass | Glass | |
| RW | 1 | 1 | 1 | |
| Dw (Lower Limit/Upper Limit) | 0.05 | 0.05 | 0.05 | |
| RA | 3 | 3 | 1 | |
| Da (Lower Limit/Upper Limit) | 0.35 0.65 | 0.35 0.65 | 0.20 | |
| Ns × Dw × 100 | 9 | 9 | 9 | |
| Ns × Da | 0.6 1.2 | 0.6 1.2 | 0.4 | |
| Vs × Dw | 2.3 | 2.5 | 1.2 | |
| Vs × Da/10 | 1.6 3.0 | 1.7 3.2 | 0.5 | |
| Object-Side Surface |SAG| | 0.21 | 0.62 | 0.90 | |
| |SD| × 2 | 4.41 | 6.11 | 5.72 | |
| Image-Side Surface |SAG| | 0.96 | 0.91 | 0.19 | |
| |SD| × 2 | 5.82 | 5.73 | 5.60 | |

8th Embodiment

The imaging apparatus according to the 8th embodiment includes an optical imaging lens assembly and an image sensor. The optical imaging lens assembly includes, in order from an object side to an image side along an optical path, an optical lens element E1, an optical lens element E2, an optical lens element E3, an optical lens element E4, an optical lens element E5, an optical lens element E6 and an image surface, wherein the image sensor is disposed on the image surface of the optical imaging lens assembly. The optical imaging lens assembly includes six optical lens elements (E1, E2, E3, E4, E5, E6) without additional one or more optical lens elements inserted between the optical lens element E1 and the optical lens element E6. There is an air gap in a paraxial region between each of adjacent optical lens elements of the six optical lens elements.

Each of the six optical lens elements includes an object-side surface and an image-side surface. The optical lens element E1, the optical lens element E2, the optical lens element E3, the optical lens element E4, the optical lens element E5, and the optical lens element E6 are made of glass, and each of the optical lens element E1, the optical lens element E2, the optical lens element E3, the optical lens element E4, the optical lens element E5, and the optical lens element E6 includes an anti-reflective coating. Each of the anti-reflective coatings is arranged on at least one surface of the object-side surface and the image-side surface of the optical lens element E1, the optical lens element E2, the optical lens element E3, the optical lens element E4, the optical lens element E5, and the optical lens element E6.

The detailed optical data of the imaging apparatus of the 8th embodiment is shown in Table 8. The definitions of these parameters shown in the following table are the same as those stated in the 1st embodiment with corresponding values for the 8th embodiment, so an explanation in this regard will not be provided again.

TABLE 8

| Optical Lens Element Composition | | 6G | | |
|---|---|---|---|---|
| Optical Lens Element Made of Molded Glass | | N/A | | |
| FOV (degree) | | 35 | | |
| TD (mm) | | 15 | | |
| SDmax (mm) | | 9 | | |

| | Object-Side Surface of E1 | | | |
|---|---|---|---|---|
| | E1 | E2 | E3 | |
| CT (mm) | 0.8 | 2.4 | 2.2 | |
| Ns | 1.70 | 1.82 | 1.81 | |
| Vs | 30.1 | 46.6 | 40.9 | |
| Material (Glass/Molded Glass/Plastic) | Glass | Glass | Glass | |
| RW | 1 | 1 | 1 | |
| Dw (Lower Limit/Upper Limit) | 0.05 | 0.05 | 0.05 | |
| RA | 1 | 2 | 3 | |
| Da (Lower Limit/Upper Limit) | 0.20 | 0.20 0.35 | 0.35 0.65 | |
| Ns × Dw × 100 | 8 | 9 | 9 | |
| Ns × Da | 0.3 | 0.4 0.6 | 0.6 1.2 | |
| Vs × Dw | 1.5 | 2.3 | 2.1 | |
| Vs × Da/10 | 0.6 | 0.9 1.6 | 1.4 2.7 | |
| Object-Side Surface |SAG| | 0.49 | 0.78 | 1.30 | |
| |SD| × 2 | 9.12 | 8.15 | 6.58 | |
| Image-Side Surface |SAG| | 1.45 | 0.20 | 0.78 | |
| |SD| × 2 | 8.13 | 7.75 | 4.63 | |

| | E4 | E5 | E6 |
|---|---|---|---|
| CT (mm) | 2.8 | 3.6 | 0.7 |
| Ns | 1.83 | 1.82 | 1.81 |
| Vs | 37.2 | 46.6 | 25.4 |
| Material (Glass/Molded Glass/Plastic) | Glass | Glass | Glass |
| RW | 1 | 1 | 1 |

TABLE 8-continued

| | E1 | | E2 | | E3 |
|---|---|---|---|---|---|
| Dw (Lower Limit/Upper Limit) | 0.05 | | 0.05 | | 0.05 |
| RA | 3 | | 2 | | 1 |
| Da (Lower Limit/Upper Limit) | 0.35 | 0.65 | 0.20 | 0.35 | 0.20 |
| Ns × Dw × 100 | 9 | | 9 | | 9 |
| Ns × Da | 0.6 | 1.2 | 0.4 | 0.6 | 0.4 |
| Vs × Dw | 1.9 | | 2.3 | | 1.3 |
| Vs × Da/10 | 1.3 | 2.4 | 0.9 | 1.6 | 0.5 |
| Object-Side Surface |SAG| | 0.40 | | 0.35 | | 1.06 |
| Object-Side Surface |SD| × 2 | 4.58 | | 5.77 | | 5.83 |
| Image-Side Surface |SAG| | 0.60 | | 1.06 | | 0.00 |
| Image-Side Surface |SD| × 2 | 5.44 | | 5.83 | | 5.85 |

9th Embodiment

The imaging apparatus according to the 9th embodiment includes an optical imaging lens assembly and an image sensor. The optical imaging lens assembly includes, in order from an object side to an image side along an optical path, an optical lens element E1, an optical lens element E2, an optical lens element E3, an optical lens element E4, an optical lens element E5, an optical lens element E6 and an image surface, wherein the image sensor is disposed on the image surface of the optical imaging lens assembly. The optical imaging lens assembly includes six optical lens elements (E1, E2, E3, E4, E5, E6) without additional one or more optical lens elements inserted between the optical lens element E1 and the optical lens element E6. There is an air gap in a paraxial region between each of adjacent optical lens elements of the six optical lens elements.

Each of the six optical lens elements includes an object-side surface and an image-side surface. The optical lens element E1, the optical lens element E2, the optical lens element E3, the optical lens element E4, the optical lens element E5, and the optical lens element E6 are made of glass, and each of the optical lens element E1, the optical lens element E2, the optical lens element E3, the optical lens element E4, the optical lens element E5, and the optical lens element E6 includes an anti-reflective coating. Each of the anti-reflective coatings is arranged on at least one surface of the object-side surface and the image-side surface of the optical lens element E1, the optical lens element E2, the optical lens element E3, the optical lens element E4, the optical lens element E5, and the optical lens element E6.

The detailed optical data of the imaging apparatus of the 9th embodiment is shown in Table 9. The definitions of these parameters shown in the following table are the same as those stated in the 1st embodiment with corresponding values for the 9th embodiment, so an explanation in this regard will not be provided again.

TABLE 9

| | | |
|---|---|---|
| Optical Lens Element Composition | 6G | |
| Optical Lens Element Made of Molded Glass | N/A | |
| FOV (degree) | 135 | |
| TD (mm) | 18 | |
| SDmax (mm) | 10 | |

| Object-Side Surface of E1 | | | |
|---|---|---|---|
| | E1 | E2 | E3 |
| CT (mm) | 1.0 | 0.8 | 2.3 |
| Ns | 1.88 | 1.77 | 1.73 |

TABLE 9-continued

| | E1 | | E2 | | E3 |
|---|---|---|---|---|---|
| Vs | 40.8 | | 49.6 | | 28.3 |
| Material (Glass/Molded Glass/Plastic) | Glass | | Glass | | Glass |
| RW | 1 | | 1 | | 1 |
| Dw (Lower Limit/Upper Limit) | 0.05 | | 0.05 | | 0.05 |
| RA | 1 | | 3 | | 1 |
| Da (Lower Limit/Upper Limit) | 0.20 | | 0.35 | 0.65 | 0.20 |
| Ns × Dw × 100 | 9 | | 9 | | 9 |
| Ns × Da | 0.4 | | 0.6 | 1.2 | 0.4 |
| Vs × Dw | 2.0 | | 2.5 | | 1.4 |
| Vs × Da/10 | 0.8 | | 1.7 | 3.2 | 0.6 |
| Object-Side Surface |SAG| | 1.18 | | 0.63 | | 0.18 |
| Object-Side Surface |SD| × 2 | 10.39 | | 5.39 | | 3.10 |
| Image-Side Surface |SAG| | 2.12 | | 0.92 | | 0.40 |
| Image-Side Surface |SD| × 2 | 6.14 | | 4.39 | | 4.07 |

| | E4 | | E5 | | E6 |
|---|---|---|---|---|---|
| CT (mm) | 4.0 | | 4.0 | | 0.8 |
| Ns | 1.80 | | 1.68 | | 1.96 |
| Vs | 46.6 | | 55.3 | | 17.5 |
| Material (Glass/Molded Glass/Plastic) | Glass | | Glass | | Glass |
| RW | 1 | | 2 | | 1 |
| Dw (Lower Limit/Upper Limit) | 0.05 | | 0.05 | 0.10 | 0.05 |
| RA | 3 | | 5 | | 1 |
| Da (Lower Limit/Upper Limit) | 0.35 | 0.65 | 1.20 | 2.20 | 0.20 |
| Ns × Dw × 100 | 9 | | 8 | 17 | 10 |
| Ns × Da | 0.6 | 1.2 | 2.0 | 3.7 | 0.4 |
| Vs × Dw | 2.3 | | 2.8 | 5.5 | 0.9 |
| Vs × Da/10 | 1.6 | 3.0 | 6.6 | 12.2 | 0.4 |
| Object-Side Surface |SAG| | 0.18 | | 0.29 | | 0.85 |
| Object-Side Surface |SD| × 2 | 3.10 | | 4.20 | | 4.36 |
| Image-Side Surface |SAG| | 0.40 | | 0.85 | | 0.24 |
| Image-Side Surface |SD| × 2 | 4.07 | | 4.36 | | 4.77 |

10th Embodiment

The imaging apparatus according to the 10th embodiment includes an optical imaging lens assembly and an image sensor. The optical imaging lens assembly includes, in order from an object side to an image side along an optical path, an optical lens element E1, an optical lens element E2, an optical lens element E3, an optical lens element E4, an optical lens element E5, an optical lens element E6, an optical lens element E7 and an image surface, wherein the image sensor is disposed on the image surface of the optical imaging lens assembly. The optical imaging lens assembly includes seven optical lens elements (E1, E2, E3, E4, E5, E6, E7) without additional one or more optical lens elements inserted between the optical lens element E1 and the optical lens element E7. There is an air gap in a paraxial region between each of adjacent optical lens elements of the seven optical lens elements.

Each of the seven optical lens elements includes an object-side surface and an image-side surface. The optical lens element E1, the optical lens element E2, the optical lens element E4, the optical lens element E5, and the optical lens element E6 are made of glass, the optical lens element E3, and the optical lens element E7 are made of molded glass, and each of the optical lens element E1, the optical lens element E2, the optical lens element E3, the optical lens element E4, the optical lens element E5, the optical lens element E6, and the optical lens element E7 includes an anti-reflective coating. Each of the anti-reflective coatings is arranged on at least one surface of the object-side surface and the image-side surface of the optical lens element E1, the optical lens element E2, the optical lens element E3, the optical lens element E4, the optical lens element E5, the optical lens element E6, and the optical lens element E7.

The detailed optical data of the imaging apparatus of the 10th embodiment is shown in Table 10. The definitions of these parameters shown in the following table are the same as those stated in the 1st embodiment and the 2nd embodiment with corresponding values for the 10th embodiment, so an explanation in this regard will not be provided again.

elements (E1, E2, E3, E4, E5, E6, E7, E8) without additional one or more optical lens elements inserted between the optical lens element E1 and the optical lens element E8. There is an air gap in a paraxial region between each of adjacent optical lens elements of the eight optical lens elements.

Each of the eight optical lens elements includes an object-side surface and an image-side surface. The optical lens element E2, the optical lens element E3, the optical lens

TABLE 10

| | | | | | | | |
|---|---|---|---|---|---|---|---|
| Optical Lens Element Composition | | | | 2MG5G | | | |
| Optical Lens Element Made of Molded Glass | | | | E3, E7 | | | |
| FOV (degree) | | | | 100 | | | |
| TD (mm) | | | | 25 | | | |
| SDmax (mm) | | | | 13 | | | |

| | | Object-Side Surface of E1 | | | | | |
|---|---|---|---|---|---|---|---|
| | | E1 | E2 | | E3 | | E4 |
| CT (mm) | | 1.0 | 0.8 | | 2.2 | | 2.6 |
| Ns | | 1.57 | 1.52 | | 1.85 | | 1.74 |
| Vs | | 56.1 | 64.2 | | 40.6 | | 44.9 |
| Material (Glass/ Molded Glass/Plastic) | | Glass | Glass | | Molded Glass | | Glass |
| RW | | 1 | 3 | | 1 | | 1 |
| Dw (Lower Limit/ Upper Limit) | | 0.05 | 0.10 0.25 | | 0.05 | | 0.05 |
| RA | | 1 | 1 | | 5 | | 3 |
| Da (Lower Limit/ Upper Limit) | | 0.20 | 0.20 | 1.20 | 2.20 | 0.35 | 0.65 |
| Ns × Dw × 100 | | 8 | 15 38 | | 9 | | 9 |
| Ns × Da | | 0.3 | 0.3 | 2.2 | 4.1 | 0.6 | 1.1 |
| Vs × Dw | | 2.8 | 6.4 16.1 | | 2.0 | | 2.3 |
| Vs × Da/10 | | 1.1 | 1.3 | 4.9 | 8.9 | 1.6 | 2.9 |
| Object-Side Surface | \|SAG\| | 0.40 | 0.92 | | 0.52 | | 1.03 |
| | \|SD\| × 2 | 12.62 | 8.27 | | 8.47 | | 9.62 |
| Image-Side Surface | \|SAG\| | 2.50 | 0.55 | | 0.35 | | 0.57 |
| | \|SD\| × 2 | 8.60 | 8.31 | | 8.61 | | 9.70 |

| | | E5 | | E6 | E7 | |
|---|---|---|---|---|---|---|
| CT (mm) | | 3.4 | | 0.8 | 5.0 | |
| Ns | | 1.62 | | 1.95 | 1.85 | |
| Vs | | 63.9 | | 17.9 | 40.6 | |
| Material (Glass/ Molded Glass/Plastic) | | Glass | | Glass | Molded Glass | |
| RW | | 1 | | 1 | 1 | |
| Dw (Lower Limit/ Upper Limit) | | 0.05 | | 0.05 | 0.05 | |
| RA | | 4 | | 1 | 5 | |
| Da (Lower Limit/ Upper Limit) | 0.65 | 1.20 | | 0.20 | 1.20 | 2.20 |
| Ns × Dw × 100 | | 8 | | 10 | 9 | |
| Ns × Da | 1.1 | 2.0 | | 0.4 | 2.2 | 4.1 |
| Vs × Dw | | 3.2 | | 0.9 | 2.0 | |
| Vs × Da/10 | 4.2 | 7.7 | | 0.4 | 4.9 | 8.9 |
| Object-Side Surface | \|SAG\| | 1.14 | | 1.25 | 0.73 | |
| | \|SD\| × 2 | 9.35 | | 8.86 | 7.97 | |
| Image-Side Surface | \|SAG\| | 1.26 | | 0.05 | 0.93 | |
| | \|SD\| × 2 | 8.87 | | 8.49 | 10.16 | |

11th Embodiment

The imaging apparatus according to the 11th embodiment includes an optical imaging lens assembly and an image sensor. The optical imaging lens assembly includes, in order from an object side to an image side along an optical path, an optical lens element E1, an optical lens element E2, an optical lens element E3, an optical lens element E4, an optical lens element E5, an optical lens element E6, an optical lens element E7, an optical lens element E8 and an image surface, wherein the image sensor is disposed on the image surface of the optical imaging lens assembly. The optical imaging lens assembly includes eight optical lens element E4, the optical lens element E6, the optical lens element E7, and the optical lens element E8 are made of glass, the optical lens element E1, and the optical lens element E5 are made of molded glass, and each of the optical lens element E1, the optical lens element E2, the optical lens element E3, the optical lens element E4, the optical lens element E5, the optical lens element E6, the optical lens element E7, and the optical lens element E8 includes an anti-reflective coating. Each of the anti-reflective coatings is arranged on at least one surface of the object-side surface and the image-side surface of the optical lens element E1, the optical lens element E2, the optical lens element E3, the optical lens element E4, the optical lens element E5, the optical lens element E6, the optical lens element E7, and the optical lens element E8.

The detailed optical data of the imaging apparatus of the 11th embodiment is shown in Table 11. The definitions of these parameters shown in the following table are the same as those stated in the 1st embodiment and the 2nd embodiment with corresponding values for the 11th embodiment, so an explanation in this regard will not be provided again.

elements (E1, E2, E3, E4, E5, E6, E7, E8) without additional one or more optical lens elements inserted between the optical lens element E1 and the optical lens element E8. There is an air gap in a paraxial region between each of adjacent optical lens elements of the eight optical lens elements.

Each of the eight optical lens elements includes an object-side surface and an image-side surface. The optical lens element E1, the optical lens element E2, the optical lens

TABLE 11

| Optical Lens Element Composition | 2MG6G |
| --- | --- |
| Optical Lens Element Made of Molded Glass | E1, E5 |
| FOV (degree) | 95 |
| TD (mm) | 27 |
| SDmax (mm) | 12 |

| | Object-Side Surface of E5 | | | |
| --- | --- | --- | --- | --- |
| | E1 | E2 | E3 | E4 |
| CT (mm) | 0.9 | 1.9 | 2.2 | 3.3 |
| Ns | 1.81 | 1.92 | 1.60 | 1.62 |
| Vs | 40.7 | 18.9 | 38.0 | 63.4 |
| Material (Glass/Molded Glass/Plastic) | Molded Glass | Glass | Glass | Glass |
| RW | 1 | 1 | 2 | 1 |
| Dw (Lower Limit/Upper Limit) | 0.05 | 0.05 | 0.05   0.10 | 0.05 |
| RA | 3 | 1 | 1 | 4 |
| Da (Lower Limit/Upper Limit) | 0.35   0.65 | 0.20 | 0.20 | 0.65   1.20 |
| Ns × Dw × 100 | 9 | 10 | 8   16 | 8 |
| Ns × Da | 0.6   1.2 | 0.4 | 0.3 | 1.1   1.9 |
| Vs × Dw | 2.0 | 1.0 | 1.9   3.8 | 3.2 |
| Vs × Da/10 | 1.4   2.7 | 0.4 | 0.8 | 4.1   7.6 |
| Object-Side Surface  \|SAG\| | 0.43 | 0.09 | 0.51 | 0.41 |
| \|SD\| × 2 | 8.66 | 5.90 | 5.30 | 8.53 |
| Image-Side Surface  \|SAG\| | 1.20 | 0.29 | 0.41 | 1.56 |
| \|SD\| × 2 | 6.57 | 5.37 | 8.53 | 9.87 |

| | E5 | E6 | E7 | E8 |
| --- | --- | --- | --- | --- |
| CT (mm) | 4.9 | 3.6 | 0.7 | 4.8 |
| Ns | 1.69 | 1.80 | 1.85 | 1.62 |
| Vs | 53.2 | 46.6 | 23.8 | 58.2 |
| Material (Glass/Molded Glass/Plastic) | Molded Glass | Glass | Glass | Glass |
| RW | 1 | 1 | 1 | 2 |
| Dw (Lower Limit/Upper Limit) | 0.05 | 0.05 | 0.05 | 0.05   0.10 |
| RA | 4 | 3 | 1 | 4 |
| Da (Lower Limit/Upper Limit) | 0.65   1.20 | 0.35   0.65 | 0.20 | 0.25   0.60 |
| Ns × Dw × 100 | 8 | 9 | 9 | 8   16 |
| Ns × Da | 1.1   2.0 | 0.6   1.2 | 0.4 | 0.4   1.0 |
| Vs × Dw | 2.7 | 2.3 | 1.2 | 2.9   5.8 |
| Vs × Da/10 | 3.5   6.4 | 1.6   3.0 | 0.5 | 1.5   3.5 |
| Object-Side Surface  \|SAG\| | 1.19 | 0.69 | 1.52 | 1.52 |
| \|SD\| × 2 | 12.11 | 11.46 | 10.94 | 10.79 |
| Image-Side Surface  \|SAG\| | 1.36 | 1.52 | 1.43 | 0.40 |
| \|SD\| × 2 | 12.11 | 10.94 | 9.67 | 10.06 |

12th Embodiment

The imaging apparatus according to the 12th embodiment includes an optical imaging lens assembly and an image sensor. The optical imaging lens assembly includes, in order from an object side to an image side along an optical path, an optical lens element E1, an optical lens element E2, an optical lens element E3, an optical lens element E4, an optical lens element E5, an optical lens element E6, an optical lens element E7, an optical lens element E8 and an image surface, wherein the image sensor is disposed on the image surface of the optical imaging lens assembly. The optical imaging lens assembly includes eight optical lens element E3, the optical lens element E4, the optical lens element E5, the optical lens element E6, and the optical lens element E7 are made of glass, the optical lens element E8 is made of molded glass, and each of the optical lens element E1, the optical lens element E2, the optical lens element E3, the optical lens element E4, the optical lens element E5, the optical lens element E6, the optical lens element E7, and the optical lens element E8 includes an anti-reflective coating. Each of the anti-reflective coatings is arranged on at least one surface of the object-side surface and the image-side surface of the optical lens element E1, the optical lens element E2, the optical lens element E3, the optical lens element E4, the optical lens element E5, the optical lens element E6, the optical lens element E7, and the optical lens element E8.

The detailed optical data of the imaging apparatus of the 12th embodiment is shown in Table 12. The definitions of these parameters shown in the following table are the same as those stated in the 1st embodiment and the 2nd embodiment with corresponding values for the 12th embodiment, so an explanation in this regard will not be provided again.

E7, E8, E9) without additional one or more optical lens elements inserted between the optical lens element E1 and the optical lens element E9. There is an air gap in a paraxial region between each of adjacent optical lens elements of the nine optical lens elements.

Each of the nine optical lens elements includes an object-side surface and an image-side surface. The optical lens element E1, the optical lens element E2, the optical lens element E3, the optical lens element E4, the optical lens

TABLE 12

| Optical Lens Element Composition | | 1MG7G | | | | | |
|---|---|---|---|---|---|---|---|
| Optical Lens Element Made of Molded Glass | | E8 | | | | | |
| FOV (degree) | | 101 | | | | | |
| TD (mm) | | 26 | | | | | |
| SDmax (mm) | | 11 | | | | | |

| | | \multicolumn{6}{c}{Object-Side Surface of E1} |
|---|---|---|---|---|---|---|---|
| | | E1 | | E2 | E3 | E4 | |
| CT (mm) | | 0.7 | | 1.7 | 1.5 | 4.0 | |
| Ns | | 1.52 | | 1.80 | 1.83 | 1.50 | |
| Vs | | 64.2 | | 46.6 | 42.7 | 81.6 | |
| Material (Glass/Molded Glass/Plastic) | | Glass | | Glass | Glass | Glass | |
| RW | | 3 | | 1 | 1 | 1 | |
| Dw (Lower Limit/Upper Limit) | | 0.10 | 0.25 | 0.05 | 0.05 | 0.05 | |
| RA | | 1 | | 3 | 2 | 2 | |
| Da (Lower Limit/Upper Limit) | | 0.20 | 0.35 | 0.65 | 0.20  0.35 | 0.20  0.35 | |
| Ns × Dw × 100 | | 15 | 38 | 9 | 9 | 7 | |
| Ns × Da | | 0.3 | | 0.6  1.2 | 0.4  0.6 | 0.3  0.5 | |
| Vs × Dw | | 6.4 | 16.1 | 2.3 | 2.1 | 4.1 | |
| Vs × Da/10 | | 1.3 | | 1.6  3.0 | 0.9  1.5 | 1.6  2.9 | |
| Object-Side Surface | \|SAG\| | 0.16 | | 1.18 | 0.37 | 0.23 | |
| | \|SD\| × 2 | 11.34 | | 6.97 | 7.45 | 9.26 | |
| Image-Side Surface | \|SAG\| | 2.11 | | 0.97 | 0.40 | 2.27 | |
| | \|SD\| × 2 | 8.01 | | 7.65 | 7.79 | 9.66 | |
| | | E5 | | E6 | E7 | E8 | |
| CT (mm) | | 0.7 | | 0.7 | 3.7 | 3.3 | |
| Ns | | 1.65 | | 1.95 | 1.77 | 1.69 | |
| Vs | | 33.8 | | 17.9 | 49.6 | 53.2 | |
| Material (Glass/Molded Glass/Plastic) | | Glass | | Glass | Glass | Molded Glass | |
| RW | | 2 | | 1 | 1 | 1 | |
| Dw (Lower Limit/Upper Limit) | | 0.05 | 0.10 | 0.05 | 0.05 | 0.05 | |
| RA | | 1 | | 1 | 3 | 4 | |
| Da (Lower Limit/Upper Limit) | | 0.20 | | 0.20 | 0.35  0.65 | 0.25  0.60 | |
| Ns × Dw × 100 | | 8 | 16 | 10 | 9 | 8 | |
| Ns × Da | | 0.3 | | 0.4 | 0.6  1.2 | 0.4  1.0 | |
| Vs × Dw | | 1.7 | 3.4 | 0.9 | 2.5 | 2.7 | |
| Vs × Da/10 | | 0.7 | | 0.4 | 1.7  3.2 | 1.3  3.2 | |
| Object-Side Surface | \|SAG\| | 2.27 | | 1.47 | 2.46 | 0.99 | |
| | \|SD\| × 2 | 9.66 | | 11.06 | 10.33 | 9.25 | |
| Image-Side Surface | \|SAG\| | 1.02 | | 2.46 | 0.13 | 0.76 | |
| | \|SD\| × 2 | 10.52 | | 10.32 | 9.96 | 10.45 | |

13th Embodiment

The imaging apparatus according to the 13th embodiment includes an optical imaging lens assembly and an image sensor. The optical imaging lens assembly includes, in order from an object side to an image side along an optical path, an optical lens element E1, an optical lens element E2, an optical lens element E3, an optical lens element E4, an optical lens element E5, an optical lens element E6, an optical lens element E7, an optical lens element E8, an optical lens element E9 and an image surface, wherein the image sensor is disposed on the image surface of the optical imaging lens assembly. The optical imaging lens assembly includes nine optical lens elements (E1, E2, E3, E4, E5, E6, element E5, the optical lens element E6, the optical lens element E7, and the optical lens element E9 are made of glass, the optical lens element E8 is made of molded glass, and each of the optical lens element E1, the optical lens element E2, the optical lens element E3, the optical lens element E4, the optical lens element E5, the optical lens element E6, the optical lens element E7, the optical lens element E8, and the optical lens element E9 includes an anti-reflective coating. Each of the anti-reflective coatings is arranged on at least one surface of the object-side surface and the image-side surface of the optical lens element E1, the optical lens element E2, the optical lens element E3, the optical lens element E4, the optical lens element E5, the optical lens element E6, the optical lens element E7, the optical lens element E8, and the optical lens element E9.

The detailed optical data of the imaging apparatus of the 13th embodiment is shown in Table 13. The definitions of these parameters shown in the following table are the same as those stated in the 1st embodiment and the 2nd embodiment with corresponding values for the 13th embodiment, so an explanation in this regard will not be provided again.

TABLE 13

| | | |
|---|---|---|
| Optical Lens Element Composition | | 1MG8G |
| Optical Lens Element Made of Molded Glass | | E8 |
| FOV (degree) | | 181 |
| TD (mm) | | 21 |
| SDmax (mm) | | 11 |

| | | Object-Side Surface of E1 | | | | | | |
|---|---|---|---|---|---|---|---|---|
| | | E1 | | E2 | | E3 | | E4 |
| CT (mm) | | 0.8 | | 0.7 | | 0.7 | | 0.7 |
| Ns | | 1.90 | | 1.49 | | 2.00 | | 1.95 |
| Vs | | 31.4 | | 70.4 | | 25.4 | | 17.9 |
| Material (Glass/Molded Glass/Plastic) | | Glass | | Glass | | Glass | | Glass |
| RW | | 1 | | 2 | | 1 | | 1 |
| Dw (Lower Limit/Upper Limit) | | | 0.05 | 0.05 | 0.10 | | 0.05 | 0.05 |
| RA | | 1 | | 4 | | 1 | | 1 |
| Da (Lower Limit/Upper Limit) | | | 0.20 | 0.65 | 1.20 | | 0.20 | 0.20 |
| Ns × Dw × 100 | | | 10 | 7 | 15 | | 10 | 10 |
| Ns × Da | | | 0.4 | 1.0 | 1.8 | | 0.4 | 0.4 |
| Vs × Dw | | | 1.6 | 3.5 | 7.0 | | 1.3 | 0.9 |
| Vs × Da/10 | | | 0.6 | 4.6 | 8.5 | | 0.5 | 0.4 |
| Object-Side Surface | \|SAG\| | 2.18 | | 0.45 | | 0.50 | | 0.10 |
| | \|SD\| × 2 | 11.28 | | 5.60 | | 3.84 | | 3.47 |
| Image-Side Surface | \|SAG\| | 2.65 | | 0.60 | | 0.43 | | 0.03 |
| | \|SD\| × 2 | 5.76 | | 4.38 | | 3.89 | | 3.86 |

| | | E5 | | E6 | | E7 | | E8 |
|---|---|---|---|---|---|---|---|---|
| CT (mm) | | 2.8 | | 3.3 | | 0.7 | | 4.3 |
| Ns | | 1.73 | | 1.73 | | 1.95 | | 1.81 |
| Vs | | 54.7 | | 54.7 | | 17.9 | | 41.0 |
| Material (Glass/Molded Glass/Plastic) | | Glass | | Glass | | Glass | | Molded Glass |
| RW | | 1 | | 1 | | 1 | | 1 |
| Dw (Lower Limit/Upper Limit) | | | 0.05 | | 0.05 | | 0.05 | 0.05 |
| RA | | 3 | | 3 | | 1 | | 6 |
| Da (Lower Limit/Upper Limit) | | 0.35 | 0.65 | 0.35 | 0.65 | | 0.20 | 2.20 |
| Ns × Dw × 100 | | | 9 | | 9 | | 10 | 0 | 9 |
| Ns × Da | | 0.6 | 1.1 | 0.6 | 1.1 | | 0.4 | 4.0 |
| Vs × Dw | | | 2.7 | | 2.7 | | 0.9 | 0.0 | 2.1 |
| Vs × Da/10 | | 1.9 | 3.6 | 1.9 | 3.6 | | 0.4 | 9.0 |
| Object-Side Surface | \|SAG\| | 0.11 | | 0.46 | | 1.85 | | 1.98 |
| | \|SD\| × 2 | 5.55 | | 7.26 | | 7.24 | | 9.96 |
| Image-Side Surface | \|SAG\| | 0.84 | | 1.86 | | 0.16 | | 0.68 |
| | \|SD\| × 2 | 6.70 | | 7.24 | | 8.11 | | 9.20 |

| | | E9 | |
|---|---|---|---|
| CT (mm) | | 0.7 | |
| Ns | | 2.00 | |
| Vs | | 25.4 | |
| Material (Glass/Molded Glass/Plastic) | | Glass | |
| RW | | 1 | |
| Dw (Lower Limit/Upper Limit) | | | 0.05 |
| RA | | 1 | |
| Da (Lower Limit/Upper Limit) | | | 0.20 |
| Ns × Dw × 100 | | | 10 |
| Ns × Da | | | 0.4 |
| Vs × Dw | | | 1.3 |
| Vs × Da/10 | | | 0.5 |
| Object-Side Surface | \|SAG\| | 0.95 | |
| | \|SD\| × 2 | 9.07 | |
| Image-Side Surface | \|SAG\| | 0.00 | |
| | \|SD\| × 2 | 8.93 | |

<Arrangement of Anti-Reflective Coating>

The arrangements of the anti-reflective coatings of the 1st comparative embodiment to the 3rd comparative embodiment and the 1st embodiment to the 3rd embodiment are further introduced and compared as follows. The arrangements of the anti-reflective coatings of the 1st comparative embodiment and the 2nd comparative embodiment are shown in Table 14.

TABLE 14

| 1st Comparative Embodiment PVD | | | | 2nd Comparative Embodiment ALD | | | |
|---|---|---|---|---|---|---|---|
| Layer No. | Material | Refractive Index | Physical Thickness (nm) | Layer No. | Material | Refractive Index | Physical Thickness (nm) |
| Substrate | Plastic | 1.55 | — | Substrate | Glass | 1.82 | — |
| 1 | $TiO_2$ | 2.35 | 14 | 1 | $TiO_2$ | 2.31 | 9 |
| 2 | $SiO_2$ | 1.46 | 33 | 2 | $SiO_2$ | 1.47 | 63 |
| 3 | $TiO_2$ | 2.35 | 56 | 3 | $TiO_2$ | 2.31 | 5 |
| 4 | $SiO_2$ | 1.46 | 9 | 4 | $Al_2O_3$ | Gradient | 224 |
| 5 | $TiO_2$ | 2.35 | 42 | | | | |
| 6 | $SiO_2$ | 1.46 | 92 | | | | |
| Total Thickness (tTK, nm) | | | 246 | Total Thickness (tTK, nm) | | | 301 |

The arrangements of the anti-reflective coatings of the 3rd comparative embodiment and the 1st embodiment are shown in Table 15.

TABLE 15

| 3rd Comparative Embodiment ALD | | | | 1st Embodiment ALD | | | |
|---|---|---|---|---|---|---|---|
| Layer No. | Material | Refractive Index | Physical Thickness (nm) | Layer No. | Material | Refractive Index | Physical Thickness (nm) |
| Substrate | Glass | 1.82 | — | Substrate | Glass | 1.82 | — |
| 1 | $Al_2O_3$ | 1.64 | 36 | 1 | $Al_2O_3$ | 1.64 | 36 |
| 2 | $TiO_2$ | 2.31 | 9 | 2 | $TiO_2$ | 2.31 | 9 |
| 3 | $SiO_2$ | 1.47 | 63 | 3 | $SiO_2$ | 1.47 | 63 |
| 4 | $TiO_2$ | 2.31 | 5 | 4 | $TiO_2$ | 2.31 | 5 |
| | | | | 5 | $Al_2O_3$ | Gradient | 224 |
| Total Thickness (tTK, nm) | | | 113 | Total Thickness (tTK, nm) | | | 337 |

According to the present disclosure, a first coating layer of the 1st embodiment is in contact with the surface of the optical lens element. The first coating layer is made of $Al_2O_3$, with the coating thickness of 36 nm and the refractive index of 1.64. A second coating layer of the 1st embodiment is over the first coating layer and in contact with the first coating layer. The second coating layer is made of $TiO_2$, with the coating thickness of 9 nm and the refractive index of 2.31. A third coating layer of the 1st embodiment is over the second coating layer and in contact with the second coating layer. The third coating layer is made of $SiO_2$, with the coating thickness of 63 nm and the refractive index of 1.47. A fourth coating layer of the 1st embodiment is over the third coating layer and in contact with the third coating layer. The fourth coating layer is made of $TiO_2$, with the coating thickness of 5 nm and the refractive index of 2.31. A fifth coating layer of the 1st embodiment is over the fourth coating layer and in contact with the fourth coating layer. The fifth coating layer is made of $Al_2O_3$, with the coating thickness of 224 nm. The refractive index of the fifth coating layer changes in gradient, and becomes smaller as away from the optical lens element.

According to the present disclosure, a total thickness of all the low refractive coating layers is TNL, a thickness of the first coating layer is TL1, and a thickness of the third coating layer is TL3. TNL of the 1st embodiment is the sum of TL1 and TL3, that is, TNL=TL1+TL3, and the following condition is satisfied: TNL=99 nm.

According to the present disclosure, a total thickness of all the high refractive coating layers is TNH, a thickness of the second coating layer is TL2, and a thickness of the fourth coating layer is TL4. TNH of the 1st embodiment is the sum of TL2 and TL4, that is, TNH=TL2+TL4, and the following condition is satisfied: TNH=14 nm.

According to the present disclosure, a thickness of the gradient refractive coating is TNG, and a thickness of the fifth coating layer is TL5. TNG of the 1st embodiment is TL5, TNG/tTK=TL5/tTK, and the following condition is satisfied: TNG/tTK=0.66.

The arrangements of the anti-reflective coatings of the 2nd embodiment and the 3rd embodiment are shown in Table 16. The definitions of these parameters shown in the following table are the same as those stated in the aforementioned paragraphs, so an explanation in this regard will not be provided again.

TABLE 16

| | 2nd Embodiment ALD | | | 3rd Embodiment ALD | | |
|---|---|---|---|---|---|---|
| Layer No. | Material | Refractive Index | Physical Thickness (nm) | Layer No. | Material | Refractive Index | Physical Thickness (nm) |
| Substrate | Glass | 1.95 | — | Substrate | Glass | 1.68 | — |
| 1 | $Al_2O_3$ | 1.64 | 29 | 1 | $Al_2O_3$ | 1.64 | 61 |
| 2 | $TiO_2$ | 2.31 | 13 | 2 | $TiO_2$ | 2.31 | 3 |
| 3 | $SiO_2$ | 1.47 | 58 | 3 | $SiO_2$ | 1.47 | 66 |
| 4 | $TiO_2$ | 2.31 | 6 | 4 | $TiO_2$ | 2.31 | 3 |
| 5 | $Al_2O_3$ | Gradient | 224 | 5 | $Al_2O_3$ | Gradient | 224 |
| Total Thickness (tTK, nm) | | | 330 | Total Thickness (tTK, nm) | | | 357 |
| TNG/tTK (=TL5/tTK) | | | 0.68 | TNG/tTK (=TL5/tTK) | | | 0.63 |
| TNL (=TL1 + TL3, nm) | | | 87 | TNL (=TL1 + TL3, nm) | | | 127 |
| TNH (=TL2 + TL4, nm) | | | 19 | TNH (=TL2 + TL4, nm) | | | 6 |

The aforementioned results are tested by the light with a reference wavelength of 510 nm and an incident angle of 0 degrees.

In Table 14 to Table 16, the anti-reflective coating of the present disclosure has a proper coating layer arrangement. Through controlling the coating thickness of the gradient refractive coating, the best porous structure is maintained, and the best design of the gradient refractive coating is effectively obtained. Therefore, the anti-reflective effect of light at large angle is improved, which prevents the decrease of anti-reflective effect due to the insufficient coating thickness. Through making the high refractive coating layer and the low refractive coating layer reach a specific thickness, the destructive interference of reflected light can easily occur at the surface of the separated coating layers, which is favorable for enhancing the anti-reflective effect.

<Thickness Measurement of Anti-Reflective Coating>

The thickness of the anti-reflective coatings of the 1st comparative embodiment and the 1st embodiment to the 3rd embodiment are measured as follows. The results of the total thickness of the anti-reflective coating at the central region of the optical lens element (Tc) and the total thickness of the anti-reflective coating at the peripheral region of the optical lens element (Tp) are shown in Table 17.

TABLE 17

| 1st Comparative Embodiment | | 1st Embodiment | | 2nd Embodiment | | 3rd Embodiment | |
|---|---|---|---|---|---|---|---|
| Central Total Thickness (Tc) (nm) | Peripheral Total Thickness (Tp) (nm) | Central Total Thickness (Tc) (nm) | Peripheral Total Thickness (Tp) (nm) | Central Total Thickness (Tc) (nm) | Peripheral Total Thickness (Tp) (nm) | Central Total Thickness (Tc) (nm) | Peripheral Total Thickness (Tp) (nm) |
| 246.65 | 208.02 | 336.60 | 336.00 | 330.00 | 329.00 | 357.00 | 356.00 |
| |Tc − Tp|/Tc 18.57% | | |Tc − Tp|/Tc 0.18% | | |Tc − Tp|/Tc 0.30% | | |Tc − Tp|/Tc 0.28% | |

In Table 17, the total thickness of the anti-reflective coating of the present disclosure at the central region and the peripheral region of the optical lens element has very small difference, which proves that the thickness of the anti-reflective coating of the present disclosure is pretty uniform. Thus, not only the defect of generating reflected light because of the uneven coating on the peripheral region with extreme surface-shape changes can be effectively solved, but the anti-reflective effect of light incident on the surface with large angle can also be improved.

<Reflectance Measurement Under Different Wavelength>

The reflectance under different wavelength of the 1st comparative embodiment, the 3rd comparative embodiment and the 1st embodiment to the 3rd embodiment are measured as follows. The results of the reflectance of the 1st comparative embodiment and the 3rd comparative embodiment are shown in Table 18.

TABLE 18

| | 1st Comparative Embodiment | 3rd Comparative Embodiment |
|---|---|---|
| Total Number of Optical Lens Elements | 7 | 6 |
| Position of Optical Lens Element Including Anti-Reflective Coating (From Object Side to Image Side) | 6 | 3 |

TABLE 18-continued

| Coating Surface | Object-Side Surface and Image-Side Surface | | Object-Side Surface and Image-Side Surface | |
|---|---|---|---|---|
| R4060 (%) | 1.82 | 0.76 | 2.83 | 3.18 |
| R4070 (%) | 1.33 | 0.70 | 2.95 | 3.29 |

TABLE 18-continued

| | | | | |
|---|---|---|---|---|
| R40100 (%) | 1.56 | 0.89 | 3.49 | 3.87 |
| R5060 (%) | 0.43 | 0.66 | 3.03 | 3.31 |
| R5070 (%) | 0.38 | 0.62 | 3.10 | 3.42 |
| R70100 (%) | 1.76 | 1.07 | 4.04 | 4.45 |
| R80100 (%) | 2.45 | 1.33 | 4.27 | 4.70 |
| R90100 (%) | 4.55 | 1.97 | 4.51 | 4.93 |

| | Reflectance (%) | | | |
|---|---|---|---|---|
| Wavelength (nm) | Central Region (0 deg.) | Peripheral Region (0 deg.) | Central Region (0 deg.) | Central Region (30 deg.) |
| 400 | 30.73 | 2.33 | 1.82 | 2.40 |
| 405 | 16.78 | 1.33 | 1.97 | 2.53 |
| 410 | 7.17 | 0.88 | 2.11 | 2.65 |
| 415 | 2.44 | 0.72 | 2.23 | 2.76 |
| 420 | 0.88 | 0.74 | 2.34 | 2.85 |
| 425 | 0.67 | 0.80 | 2.44 | 2.93 |
| 430 | 0.79 | 0.86 | 2.53 | 2.99 |
| 435 | 0.81 | 0.92 | 2.60 | 3.04 |
| 440 | 0.70 | 0.94 | 2.66 | 3.09 |
| 445 | 0.52 | 0.92 | 2.72 | 3.13 |
| 450 | 0.37 | 0.89 | 2.77 | 3.16 |
| 455 | 0.28 | 0.83 | 2.81 | 3.19 |
| 460 | 0.26 | 0.79 | 2.85 | 3.21 |
| 465 | 0.30 | 0.73 | 2.88 | 3.23 |
| 470 | 0.36 | 0.68 | 2.91 | 3.25 |
| 475 | 0.43 | 0.65 | 2.93 | 3.26 |
| 480 | 0.48 | 0.62 | 2.95 | 3.27 |
| 485 | 0.50 | 0.61 | 2.97 | 3.27 |
| 490 | 0.49 | 0.60 | 2.98 | 3.28 |
| 495 | 0.47 | 0.60 | 2.99 | 3.29 |
| 500 | 0.43 | 0.61 | 3.00 | 3.29 |
| 505 | 0.39 | 0.62 | 3.00 | 3.29 |
| 510 | 0.36 | 0.63 | 3.01 | 3.29 |
| 515 | 0.34 | 0.65 | 3.01 | 3.29 |
| 520 | 0.33 | 0.67 | 3.01 | 3.29 |
| 525 | 0.34 | 0.68 | 3.01 | 3.29 |
| 530 | 0.36 | 0.69 | 3.02 | 3.29 |
| 535 | 0.38 | 0.70 | 3.02 | 3.29 |
| 540 | 0.41 | 0.70 | 3.02 | 3.29 |
| 545 | 0.44 | 0.70 | 3.02 | 3.30 |
| 550 | 0.46 | 0.70 | 3.02 | 3.30 |
| 555 | 0.48 | 0.70 | 3.02 | 3.31 |
| 560 | 0.49 | 0.69 | 3.03 | 3.31 |
| 565 | 0.49 | 0.68 | 3.03 | 3.31 |
| 570 | 0.49 | 0.67 | 3.03 | 3.32 |
| 575 | 0.49 | 0.66 | 3.03 | 3.32 |
| 580 | 0.49 | 0.64 | 3.04 | 3.33 |
| 585 | 0.48 | 0.63 | 3.04 | 3.34 |
| 590 | 0.47 | 0.62 | 3.05 | 3.35 |
| 595 | 0.46 | 0.61 | 3.06 | 3.36 |
| 600 | 0.45 | 0.60 | 3.06 | 3.37 |
| 605 | 0.45 | 0.59 | 3.07 | 3.38 |
| 610 | 0.44 | 0.58 | 3.08 | 3.39 |
| 615 | 0.43 | 0.58 | 3.09 | 3.41 |
| 620 | 0.42 | 0.57 | 3.10 | 3.42 |
| 625 | 0.41 | 0.57 | 3.11 | 3.43 |
| 630 | 0.40 | 0.57 | 3.12 | 3.45 |
| 635 | 0.39 | 0.57 | 3.13 | 3.46 |
| 640 | 0.37 | 0.57 | 3.14 | 3.48 |
| 645 | 0.36 | 0.57 | 3.16 | 3.50 |
| 650 | 0.34 | 0.57 | 3.17 | 3.51 |
| 655 | 0.32 | 0.57 | 3.19 | 3.53 |
| 660 | 0.30 | 0.57 | 3.20 | 3.55 |
| 665 | 0.29 | 0.58 | 3.22 | 3.57 |
| 670 | 0.27 | 0.58 | 3.23 | 3.59 |
| 675 | 0.25 | 0.58 | 3.25 | 3.61 |
| 680 | 0.24 | 0.58 | 3.27 | 3.63 |
| 685 | 0.23 | 0.58 | 3.29 | 3.65 |
| 690 | 0.22 | 0.58 | 3.30 | 3.67 |
| 695 | 0.22 | 0.58 | 3.32 | 3.70 |
| 700 | 0.22 | 0.57 | 3.34 | 3.72 |
| 705 | 0.23 | 0.57 | 3.36 | 3.74 |
| 710 | 0.23 | 0.57 | 3.38 | 3.76 |
| 715 | 0.25 | 0.56 | 3.40 | 3.78 |
| 720 | 0.26 | 0.56 | 3.42 | 3.81 |
| 725 | 0.28 | 0.55 | 3.44 | 3.83 |
| 730 | 0.30 | 0.54 | 3.47 | 3.86 |
| 735 | 0.32 | 0.54 | 3.49 | 3.88 |
| 740 | 0.34 | 0.53 | 3.51 | 3.91 |
| 745 | 0.36 | 0.52 | 3.54 | 3.93 |
| 750 | 0.38 | 0.51 | 3.56 | 3.96 |
| 755 | 0.39 | 0.50 | 3.58 | 3.98 |
| 760 | 0.41 | 0.50 | 3.61 | 4.01 |
| 765 | 0.41 | 0.49 | 3.63 | 4.03 |
| 770 | 0.42 | 0.48 | 3.65 | 4.06 |
| 775 | 0.42 | 0.48 | 3.68 | 4.08 |
| 780 | 0.41 | 0.47 | 3.70 | 4.11 |
| 785 | 0.40 | 0.47 | 3.72 | 4.13 |
| 790 | 0.38 | 0.47 | 3.75 | 4.16 |
| 795 | 0.37 | 0.47 | 3.77 | 4.18 |
| 800 | 0.34 | 0.47 | 3.79 | 4.21 |
| 805 | 0.32 | 0.48 | 3.82 | 4.23 |
| 810 | 0.28 | 0.48 | 3.84 | 4.26 |
| 815 | 0.25 | 0.49 | 3.87 | 4.29 |
| 820 | 0.22 | 0.50 | 3.89 | 4.31 |
| 825 | 0.18 | 0.51 | 3.92 | 4.34 |
| 830 | 0.16 | 0.53 | 3.94 | 4.36 |
| 835 | 0.13 | 0.55 | 3.97 | 4.39 |
| 840 | 0.11 | 0.57 | 3.99 | 4.41 |
| 845 | 0.09 | 0.59 | 4.02 | 4.44 |
| 850 | 0.09 | 0.62 | 4.04 | 4.46 |
| 855 | 0.09 | 0.65 | 4.07 | 4.49 |
| 860 | 0.11 | 0.69 | 4.09 | 4.51 |
| 865 | 0.14 | 0.72 | 4.11 | 4.54 |
| 870 | 0.19 | 0.77 | 4.14 | 4.56 |
| 875 | 0.25 | 0.81 | 4.16 | 4.59 |
| 880 | 0.34 | 0.86 | 4.19 | 4.61 |
| 885 | 0.44 | 0.91 | 4.21 | 4.64 |
| 890 | 0.57 | 0.96 | 4.23 | 4.66 |
| 895 | 0.72 | 1.02 | 4.26 | 4.68 |
| 900 | 0.89 | 1.08 | 4.28 | 4.71 |
| 905 | 1.09 | 1.15 | 4.31 | 4.73 |
| 910 | 1.31 | 1.22 | 4.33 | 4.75 |
| 915 | 1.57 | 1.30 | 4.35 | 4.78 |
| 920 | 1.85 | 1.38 | 4.38 | 4.80 |
| 925 | 2.15 | 1.46 | 4.40 | 4.82 |
| 930 | 2.49 | 1.54 | 4.42 | 4.84 |
| 935 | 2.86 | 1.63 | 4.44 | 4.87 |
| 940 | 3.24 | 1.72 | 4.47 | 4.89 |
| 945 | 3.66 | 1.82 | 4.49 | 4.91 |
| 950 | 4.10 | 1.92 | 4.51 | 4.93 |
| 955 | 4.57 | 2.02 | 4.53 | 4.96 |
| 960 | 5.06 | 2.13 | 4.55 | 4.98 |
| 965 | 5.57 | 2.23 | 4.58 | 5.00 |
| 970 | 6.12 | 2.34 | 4.60 | 5.02 |
| 975 | 6.67 | 2.45 | 4.62 | 5.04 |
| 980 | 7.25 | 2.57 | 4.64 | 5.06 |
| 985 | 7.85 | 2.69 | 4.66 | 5.08 |
| 990 | 8.45 | 2.81 | 4.68 | 5.10 |
| 995 | 9.07 | 2.93 | 4.70 | 5.12 |
| 1000 | 9.72 | 3.05 | 4.72 | 5.14 |

The results of the reflectance of the 1st embodiment to the 3rd embodiment are shown in Table 19.

TABLE 19

| | 1st Embodiment | 2nd Embodiment | 3rd Embodiment |
|---|---|---|---|
| Total Number of Optical Lens Elements | 6 | 6 | 6 |
| Position of Optical Lens Element Including Anti-Reflective Coating (From Object Side to Image Side) | 3 | 2 | 1 |

TABLE 19-continued

| Coating Surface | Object-Side Surface and Image-Side Surface | Object-Side Surface and Image-Side Surface | Object-Side Surface and Image-Side Surface |
|---|---|---|---|
| R4060 (%) | 0.02 | 0.02 | 0.03 | 0.03 |
| R4070 (%) | 0.02 | 0.02 | 0.03 | 0.02 |
| R40100 (%) | 0.05 | 0.12 | 0.05 | 0.07 |
| R5060 (%) | 0.02 | 0.02 | 0.02 | 0.03 |
| R5070 (%) | 0.02 | 0.02 | 0.03 | 0.02 |
| R70100 (%) | 0.08 | 0.22 | 0.06 | 0.11 |
| R80100 (%) | 0.11 | 0.31 | 0.08 | 0.16 |
| R90100 (%) | 0.18 | 0.44 | 0.14 | 0.24 |

Reflectance (%)

| Wavelength (nm) | Central Region (0 deg.) | Central Region (30 deg.) | Central Region (0 deg.) | Central Region (0 deg.) |
|---|---|---|---|---|
| 400 | 0.08 | 0.00 | 0.06 | 0.06 |
| 405 | 0.05 | 0.00 | 0.03 | 0.05 |
| 410 | 0.03 | 0.01 | 0.02 | 0.04 |
| 415 | 0.02 | 0.01 | 0.02 | 0.03 |
| 420 | 0.01 | 0.02 | 0.02 | 0.03 |
| 425 | 0.01 | 0.03 | 0.02 | 0.02 |
| 430 | 0.01 | 0.03 | 0.03 | 0.02 |
| 435 | 0.02 | 0.04 | 0.04 | 0.02 |
| 440 | 0.02 | 0.04 | 0.04 | 0.02 |
| 445 | 0.02 | 0.04 | 0.04 | 0.02 |
| 450 | 0.03 | 0.04 | 0.05 | 0.02 |
| 455 | 0.03 | 0.04 | 0.05 | 0.02 |
| 460 | 0.03 | 0.04 | 0.05 | 0.02 |
| 465 | 0.03 | 0.04 | 0.05 | 0.02 |
| 470 | 0.03 | 0.04 | 0.05 | 0.02 |
| 475 | 0.03 | 0.03 | 0.05 | 0.02 |
| 480 | 0.03 | 0.03 | 0.05 | 0.02 |
| 485 | 0.03 | 0.03 | 0.04 | 0.02 |
| 490 | 0.03 | 0.03 | 0.04 | 0.02 |
| 495 | 0.03 | 0.02 | 0.03 | 0.02 |
| 500 | 0.03 | 0.02 | 0.03 | 0.02 |
| 505 | 0.03 | 0.02 | 0.03 | 0.02 |
| 510 | 0.03 | 0.02 | 0.02 | 0.02 |
| 515 | 0.02 | 0.02 | 0.02 | 0.02 |
| 520 | 0.02 | 0.02 | 0.02 | 0.03 |
| 525 | 0.02 | 0.02 | 0.01 | 0.03 |
| 530 | 0.02 | 0.02 | 0.01 | 0.03 |
| 535 | 0.02 | 0.01 | 0.01 | 0.03 |
| 540 | 0.02 | 0.02 | 0.01 | 0.03 |
| 545 | 0.01 | 0.02 | 0.01 | 0.03 |
| 550 | 0.01 | 0.02 | 0.01 | 0.03 |
| 555 | 0.01 | 0.02 | 0.01 | 0.03 |
| 560 | 0.01 | 0.02 | 0.01 | 0.03 |
| 565 | 0.01 | 0.02 | 0.01 | 0.03 |
| 570 | 0.01 | 0.02 | 0.01 | 0.03 |
| 575 | 0.01 | 0.02 | 0.02 | 0.03 |
| 580 | 0.01 | 0.02 | 0.02 | 0.03 |
| 585 | 0.02 | 0.02 | 0.02 | 0.03 |
| 590 | 0.02 | 0.02 | 0.02 | 0.03 |
| 595 | 0.02 | 0.02 | 0.03 | 0.03 |
| 600 | 0.02 | 0.03 | 0.03 | 0.03 |
| 605 | 0.02 | 0.03 | 0.03 | 0.03 |
| 610 | 0.02 | 0.03 | 0.03 | 0.03 |
| 615 | 0.02 | 0.03 | 0.03 | 0.03 |
| 620 | 0.02 | 0.03 | 0.04 | 0.03 |
| 625 | 0.02 | 0.03 | 0.04 | 0.03 |
| 630 | 0.02 | 0.03 | 0.04 | 0.03 |
| 635 | 0.02 | 0.03 | 0.04 | 0.02 |
| 640 | 0.02 | 0.03 | 0.04 | 0.02 |
| 645 | 0.02 | 0.03 | 0.04 | 0.02 |
| 650 | 0.02 | 0.03 | 0.04 | 0.02 |
| 655 | 0.02 | 0.03 | 0.04 | 0.02 |
| 660 | 0.02 | 0.03 | 0.04 | 0.02 |
| 665 | 0.02 | 0.03 | 0.04 | 0.02 |
| 670 | 0.02 | 0.03 | 0.04 | 0.02 |
| 675 | 0.02 | 0.03 | 0.04 | 0.02 |
| 680 | 0.02 | 0.03 | 0.04 | 0.01 |
| 685 | 0.02 | 0.03 | 0.04 | 0.01 |
| 690 | 0.02 | 0.03 | 0.04 | 0.01 |
| 695 | 0.02 | 0.03 | 0.04 | 0.01 |
| 700 | 0.02 | 0.03 | 0.04 | 0.01 |
| 705 | 0.02 | 0.03 | 0.03 | 0.01 |
| 710 | 0.02 | 0.03 | 0.03 | 0.01 |
| 715 | 0.02 | 0.03 | 0.03 | 0.01 |
| 720 | 0.01 | 0.03 | 0.03 | 0.01 |
| 725 | 0.01 | 0.03 | 0.03 | 0.01 |
| 730 | 0.01 | 0.03 | 0.02 | 0.01 |
| 735 | 0.01 | 0.03 | 0.02 | 0.01 |
| 740 | 0.01 | 0.03 | 0.02 | 0.01 |
| 745 | 0.01 | 0.04 | 0.02 | 0.01 |
| 750 | 0.01 | 0.04 | 0.01 | 0.01 |
| 755 | 0.01 | 0.04 | 0.01 | 0.01 |
| 760 | 0.01 | 0.04 | 0.01 | 0.01 |
| 765 | 0.01 | 0.05 | 0.01 | 0.01 |
| 770 | 0.01 | 0.05 | 0.01 | 0.01 |
| 775 | 0.01 | 0.05 | 0.01 | 0.02 |
| 780 | 0.01 | 0.06 | 0.00 | 0.02 |
| 785 | 0.01 | 0.06 | 0.00 | 0.02 |
| 790 | 0.01 | 0.07 | 0.00 | 0.02 |
| 795 | 0.01 | 0.07 | 0.00 | 0.03 |
| 800 | 0.01 | 0.08 | 0.00 | 0.03 |
| 805 | 0.01 | 0.08 | 0.00 | 0.03 |
| 810 | 0.01 | 0.09 | 0.00 | 0.04 |
| 815 | 0.01 | 0.10 | 0.00 | 0.04 |
| 820 | 0.01 | 0.11 | 0.00 | 0.04 |
| 825 | 0.02 | 0.11 | 0.00 | 0.05 |
| 830 | 0.02 | 0.12 | 0.00 | 0.05 |
| 835 | 0.02 | 0.13 | 0.00 | 0.06 |
| 840 | 0.02 | 0.14 | 0.01 | 0.06 |
| 845 | 0.03 | 0.15 | 0.01 | 0.07 |
| 850 | 0.03 | 0.16 | 0.01 | 0.07 |
| 855 | 0.03 | 0.17 | 0.01 | 0.08 |
| 860 | 0.04 | 0.18 | 0.02 | 0.08 |
| 865 | 0.04 | 0.19 | 0.02 | 0.09 |
| 870 | 0.05 | 0.20 | 0.02 | 0.10 |
| 875 | 0.05 | 0.21 | 0.03 | 0.10 |
| 880 | 0.06 | 0.23 | 0.03 | 0.11 |
| 885 | 0.06 | 0.24 | 0.04 | 0.12 |
| 890 | 0.07 | 0.25 | 0.04 | 0.13 |
| 895 | 0.08 | 0.27 | 0.05 | 0.13 |
| 900 | 0.08 | 0.28 | 0.05 | 0.14 |
| 905 | 0.09 | 0.29 | 0.06 | 0.15 |
| 910 | 0.10 | 0.31 | 0.07 | 0.16 |
| 915 | 0.11 | 0.32 | 0.07 | 0.17 |
| 920 | 0.12 | 0.34 | 0.08 | 0.18 |
| 925 | 0.12 | 0.35 | 0.09 | 0.19 |
| 930 | 0.13 | 0.37 | 0.10 | 0.20 |
| 935 | 0.14 | 0.39 | 0.11 | 0.21 |
| 940 | 0.15 | 0.40 | 0.12 | 0.22 |
| 945 | 0.16 | 0.42 | 0.13 | 0.23 |
| 950 | 0.17 | 0.44 | 0.14 | 0.24 |
| 955 | 0.18 | 0.46 | 0.15 | 0.25 |
| 960 | 0.20 | 0.47 | 0.16 | 0.26 |
| 965 | 0.21 | 0.49 | 0.17 | 0.27 |
| 970 | 0.22 | 0.51 | 0.18 | 0.28 |
| 975 | 0.23 | 0.53 | 0.19 | 0.29 |
| 980 | 0.24 | 0.55 | 0.21 | 0.31 |
| 985 | 0.26 | 0.57 | 0.22 | 0.32 |
| 990 | 0.27 | 0.59 | 0.23 | 0.33 |
| 995 | 0.28 | 0.61 | 0.25 | 0.34 |
| 1000 | 0.30 | 0.63 | 0.26 | 0.35 |

Figure 2:
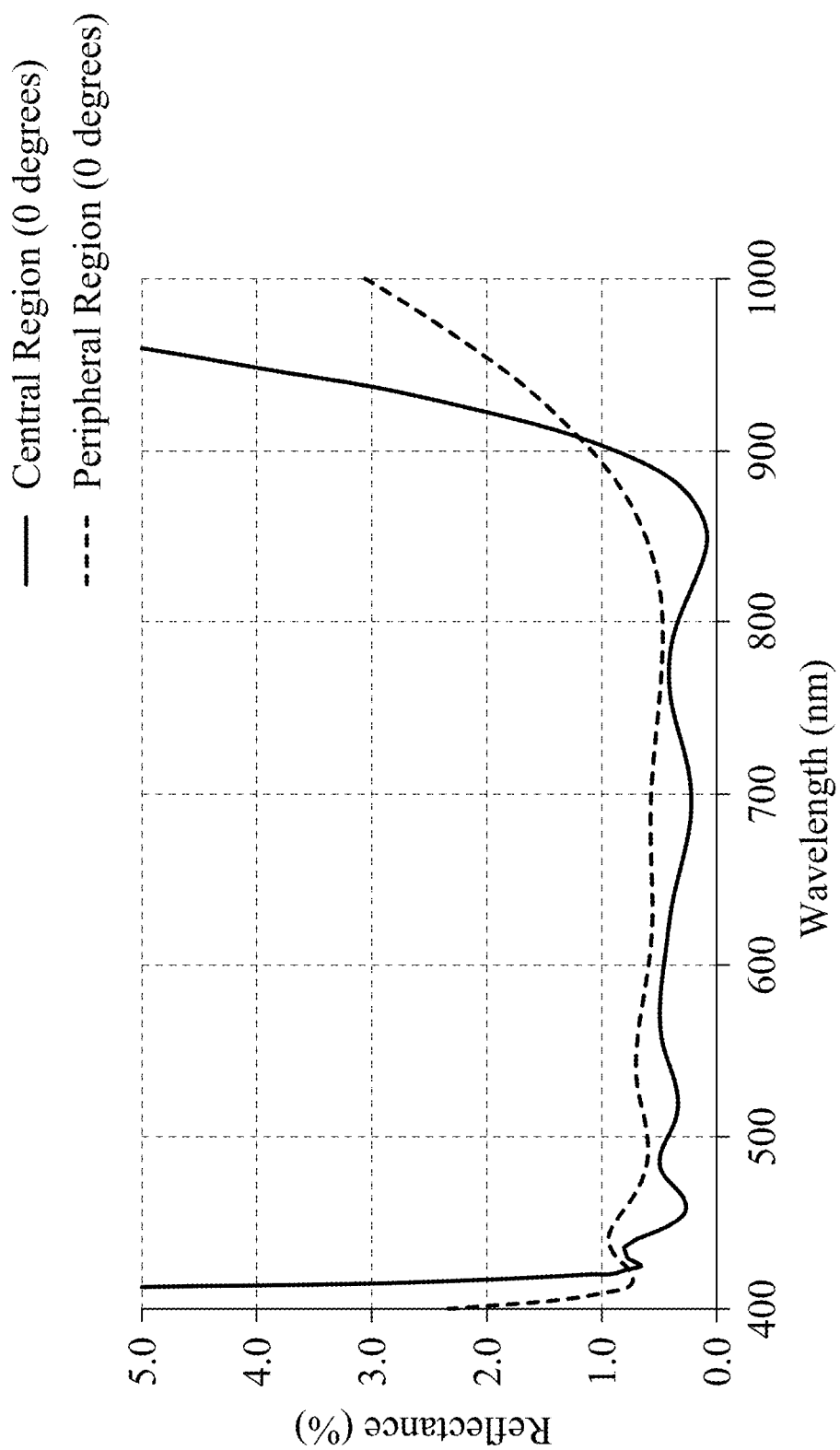
FIG. 2 is a relationship diagram of reflectance and wavelength according to the 1st comparative embodiment.
Figure 3:
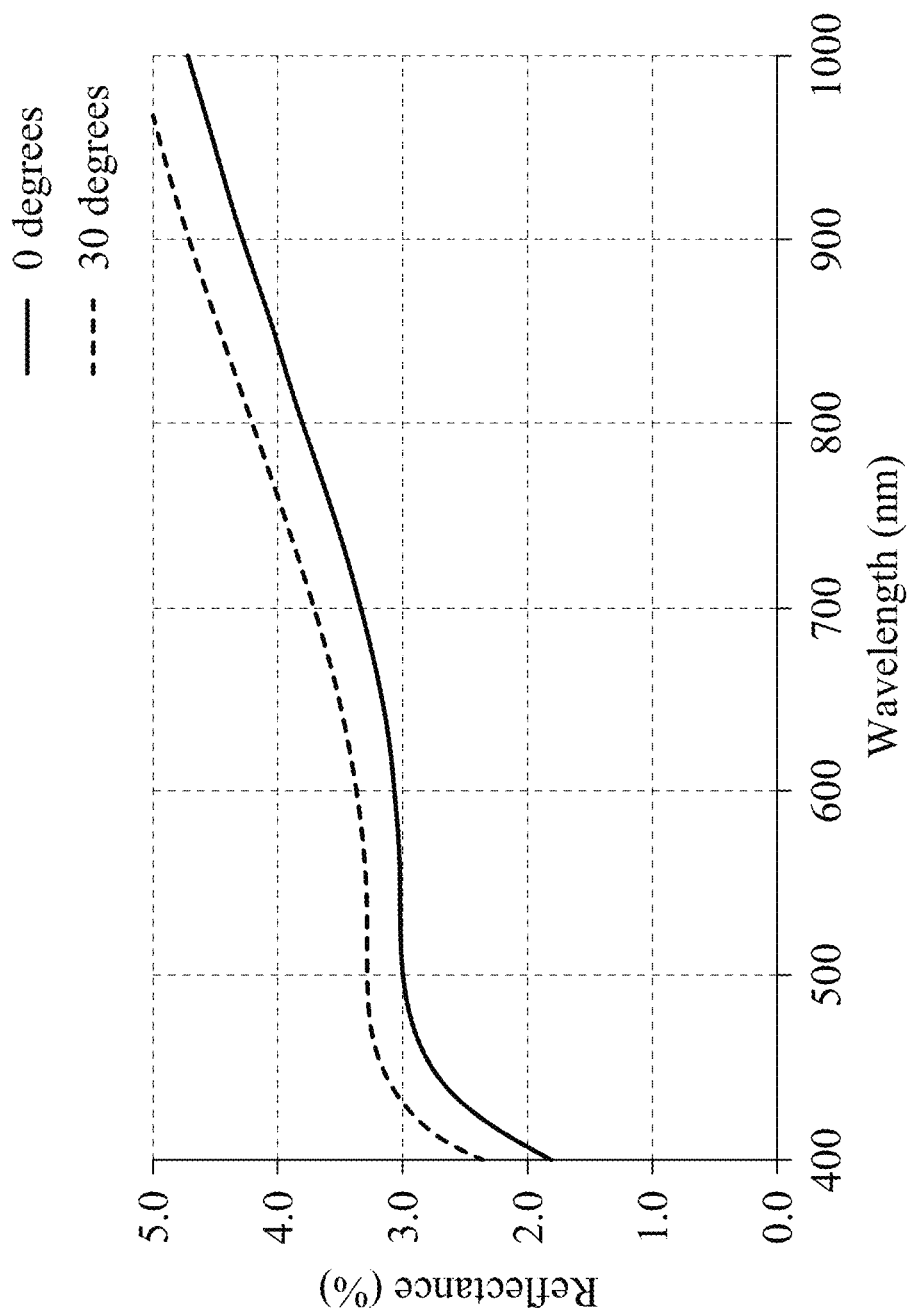
FIG. 3 is a relationship diagram of reflectance and wavelength according to the 3rd comparative embodiment.
Figure 4:
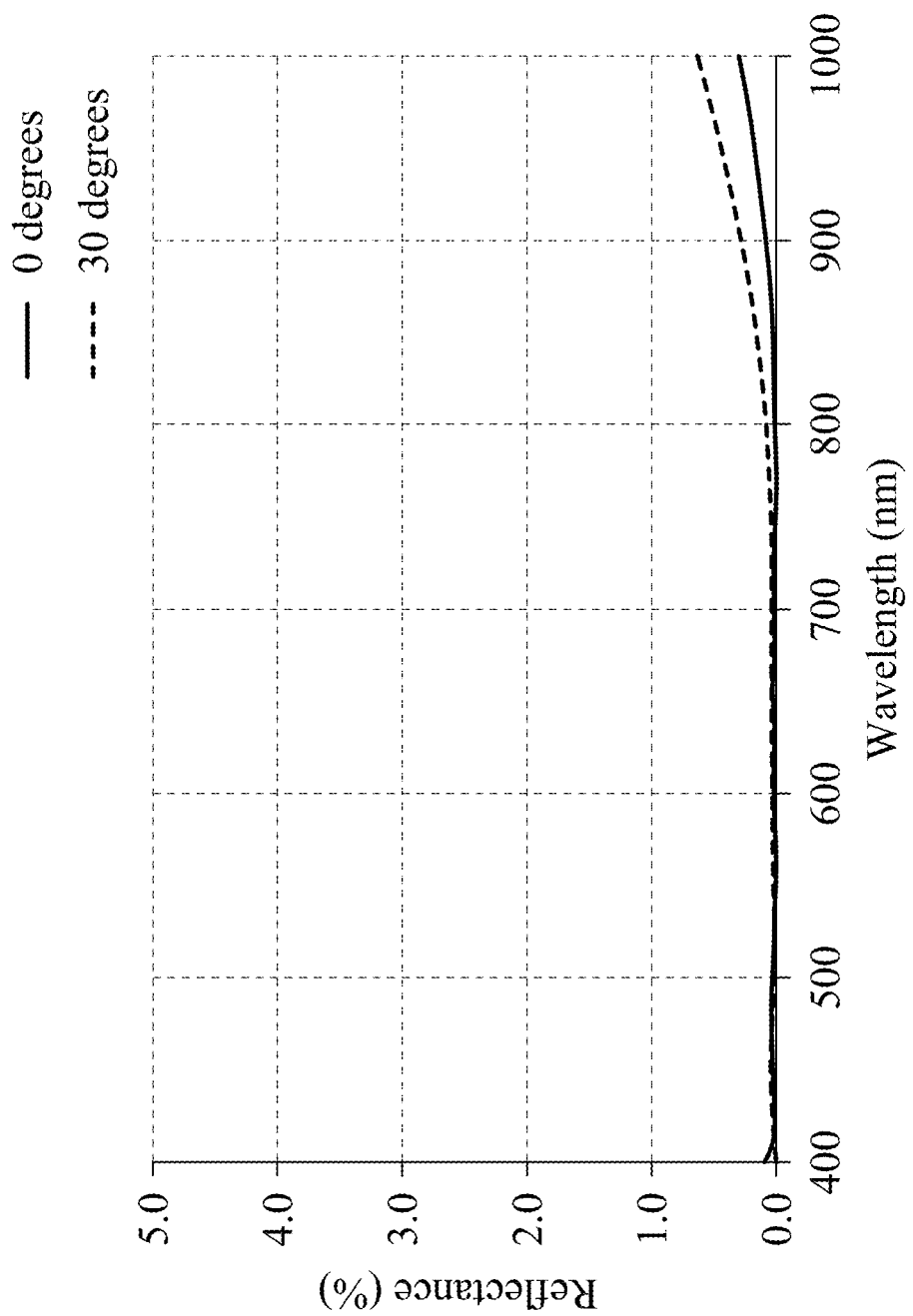
FIG. 4 is a relationship diagram of reflectance and wavelength according to the 1st embodiment.
Figure 5:
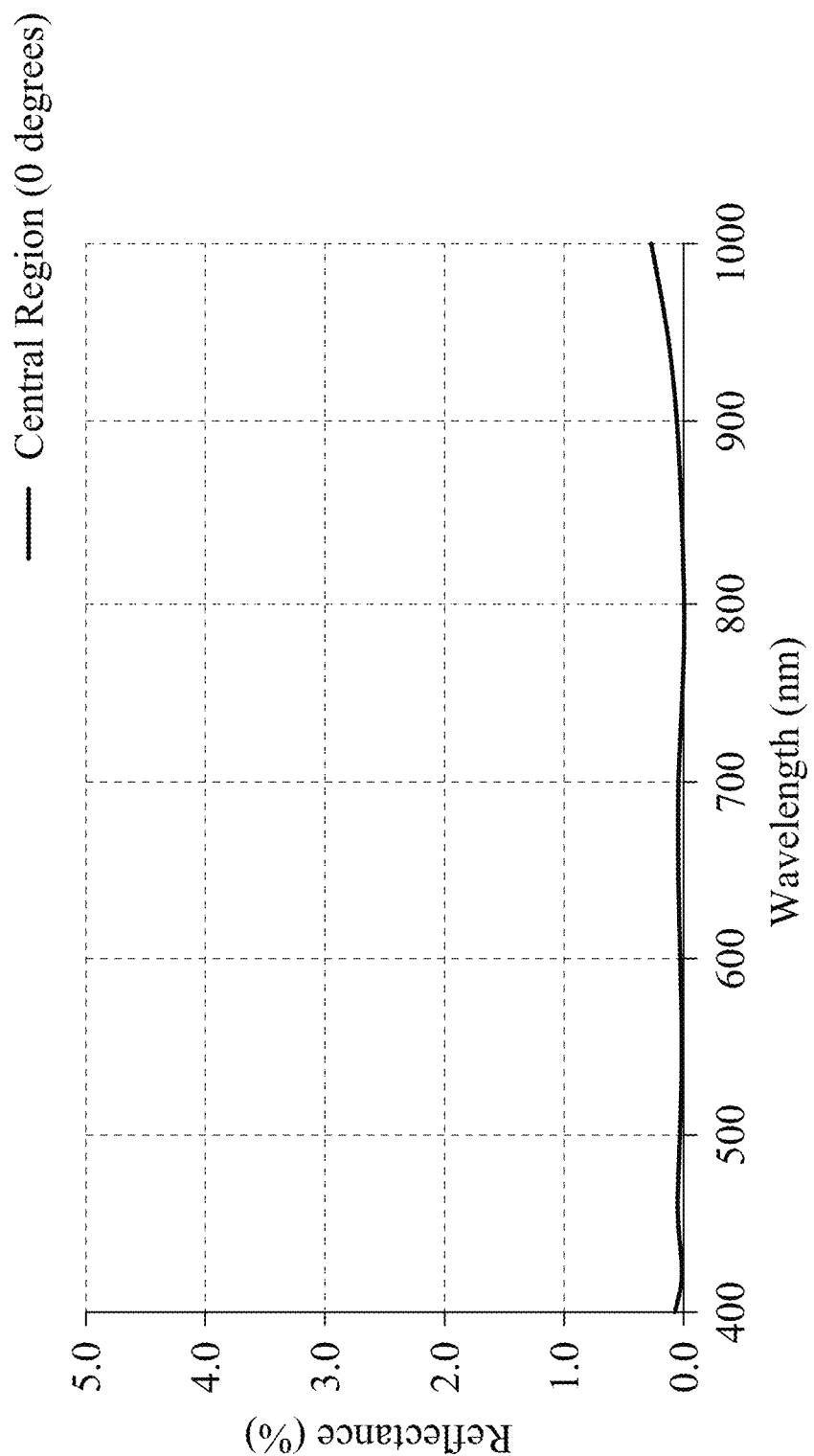
FIG. 5 is a relationship diagram of reflectance and wavelength according to the 2nd embodiment.
Figure 6:
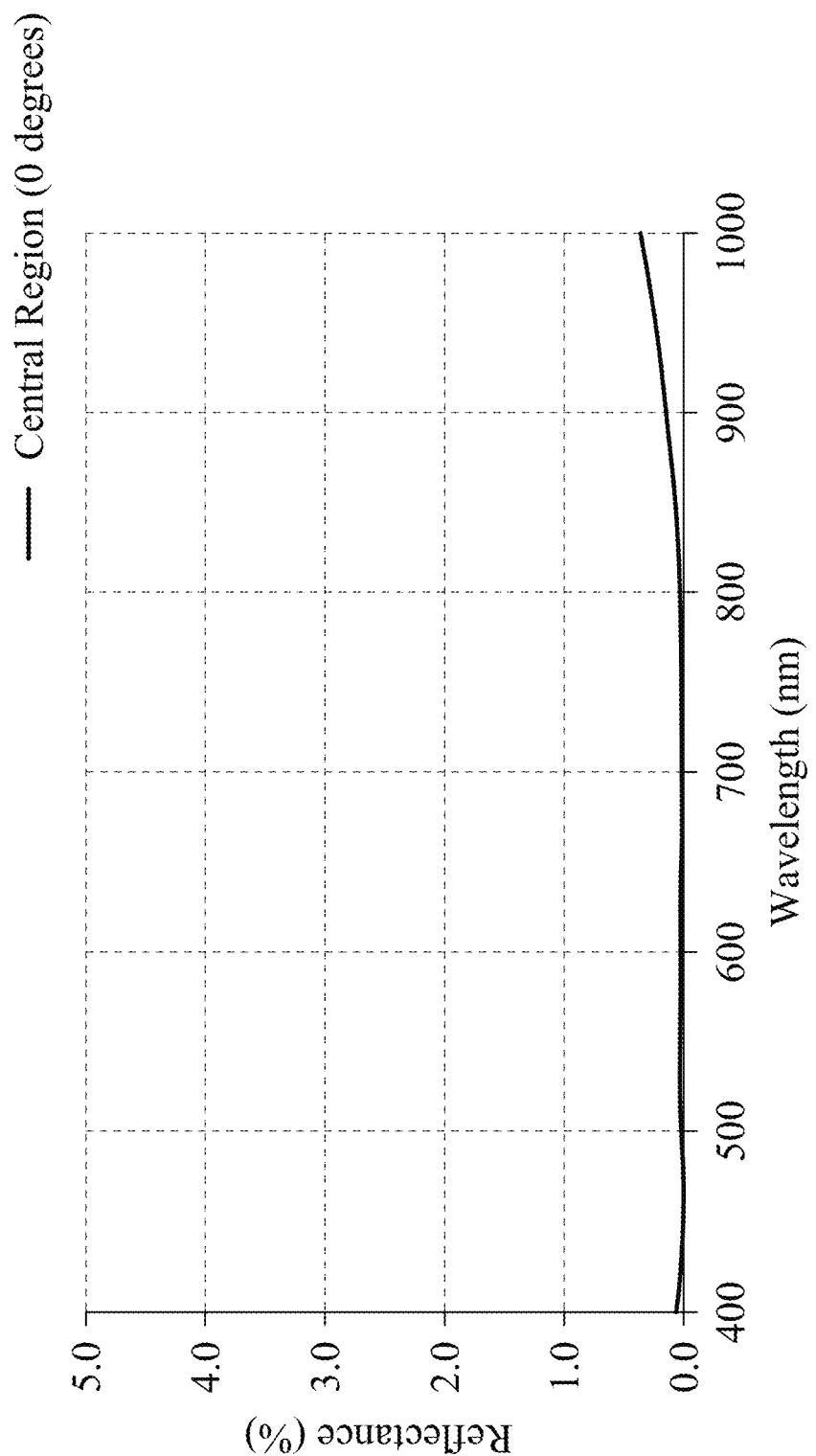
FIG. 6 is a relationship diagram of reflectance and wavelength according to the 3rd embodiment.

Please also refer to FIG. 2 to FIG. 6. FIG. 2 is a relationship diagram of reflectance and wavelength according to the 1st comparative embodiment. FIG. 3 is a relationship diagram of reflectance and wavelength according to the 3rd comparative embodiment. FIG. 4 is a relationship diagram of reflectance and wavelength according to the 1st embodiment. FIG. 5 is a relationship diagram of reflectance and wavelength according to the 2nd embodiment. FIG. 6 is a relationship diagram of reflectance and wavelength according to the 3rd embodiment. In Table 18, Table 19 and FIG. 2 to FIG. 6, the anti-reflective effect in the wide field of wavelength region can be effectively provided by the imaging apparatus of the present disclosure, and the severe reflective problem of light at large angle can also be solved.

<Test of Anti-Oxidizing Property>

Figure 7B:
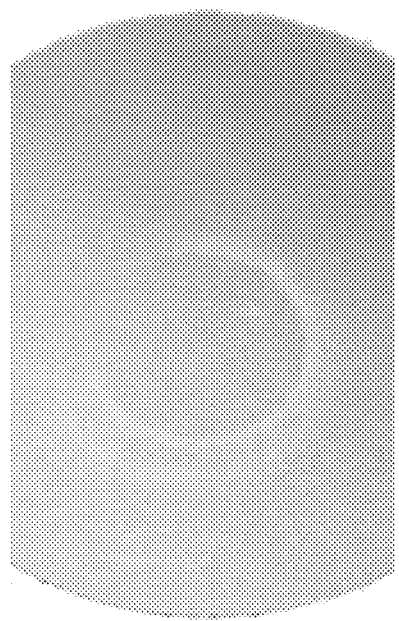
FIG. 7B is a surface quality image of a substrate of an optical lens element according to the 1st embodiment.
Figure 7A:
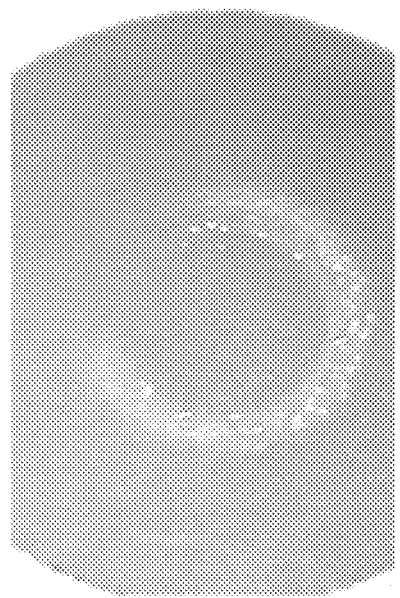
FIG. 7A is a surface quality image of a substrate of an optical lens element according to the 2nd comparative embodiment.

Please refer to FIG. 7A and FIG. 7B. FIG. 7A is a surface quality image of a substrate of an optical lens element according to the 2nd comparative embodiment. FIG. 7B is a surface quality image of a substrate of an optical lens element according to the 1st embodiment. In FIG. 7A and FIG. 7B, the substrate of the optical lens element of the 2nd comparative embodiment is obviously oxidized and has patchy defects on the surface thereof. The substrate of the optical lens element of the 1st embodiment has the anti-oxidizing ability and the condition of the surface thereof is great. Therefore, the anti-oxidizing effect for the substrate of the optical lens element can be provided by the anti-reflective coating of the imaging apparatus of the present disclosure.

14th Embodiment

Figure 8:
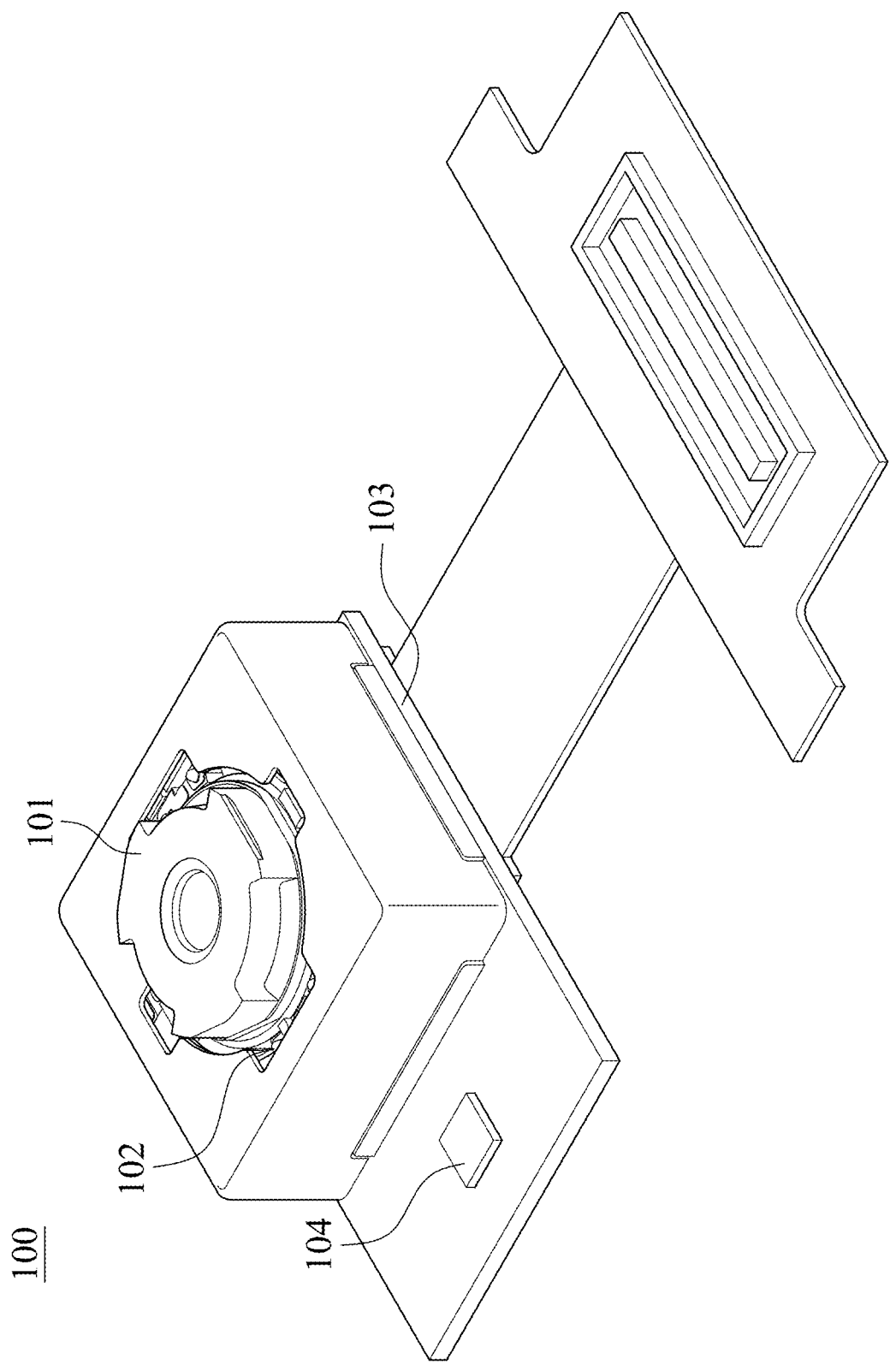
FIG. 8 is a three-dimensional schematic view of an imaging apparatus according to the 14th embodiment of the present disclosure.

Please refer to FIG. 8. FIG. 8 is a three-dimensional schematic view of an imaging apparatus 100 according to the 14th embodiment of the present disclosure. In FIG. 8, the imaging apparatus 100 of the 14th embodiment is a camera module, the imaging apparatus 100 includes an imaging lens assembly 101, a driving apparatus 102 and an image sensor 103, wherein the imaging lens assembly 101 includes the optical imaging lens assembly of the present disclosure and a lens barrel (its reference number is omitted) for carrying the optical imaging lens assembly. The imaging apparatus 100 can focus light from an imaged object via the imaging lens assembly 101, perform image focusing by the driving apparatus 102, and generate an image on the image sensor 103, and the imaging information can be transmitted.

The driving apparatus 102 can be an auto-focus module, which can be driven by driving systems, such as voice coil motors (VCM), micro electro-mechanical systems (MEMS), piezoelectric systems, and shape memory alloys. The optical imaging lens assembly can obtain a favorable imaging position by the driving apparatus 102 so as to capture clear images when the imaged object is disposed at different object distances.

The imaging apparatus 100 can include the image sensor 103 located on the image surface of the optical imaging lens assembly, such as CMOS and CCD, with superior photosensitivity and low noise. Thus, it is favorable for providing realistic images with high definition image quality thereof. Moreover, the imaging apparatus 100 can further include an image stabilization module 104, which can be a kinetic energy sensor, such as an accelerometer, a gyro sensor, or a Hall effect sensor. In the 14th embodiment, the image stabilization module 104 is a gyro sensor, but is not limited thereto. Therefore, the variation of different axial directions of the optical imaging lens assembly can be adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS), can be provided.

15th Embodiment

Figure 9A:
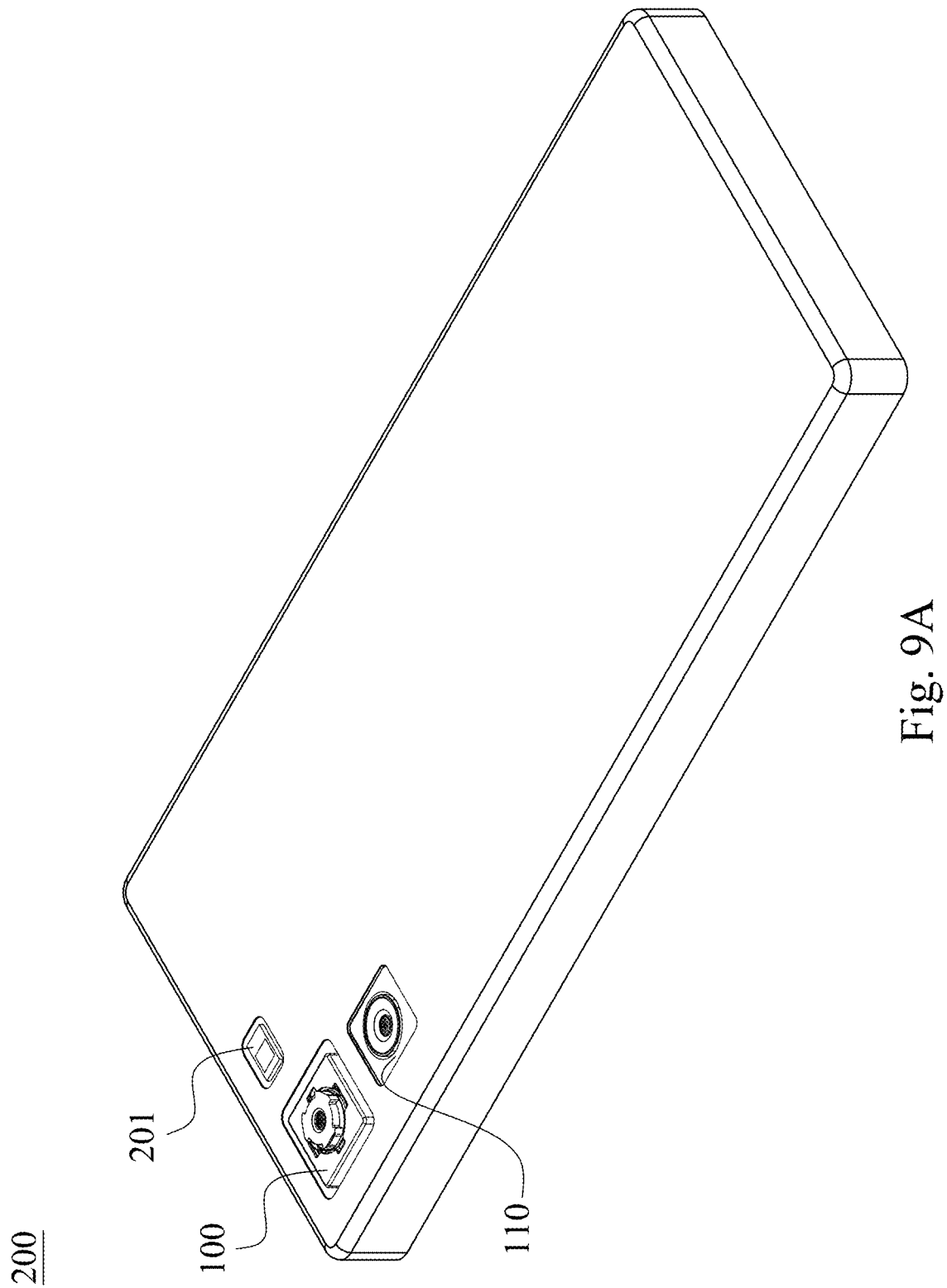
FIG. 9A is a schematic view of one side of an electronic device according to the 15th embodiment of the present disclosure.
Figure 9B:
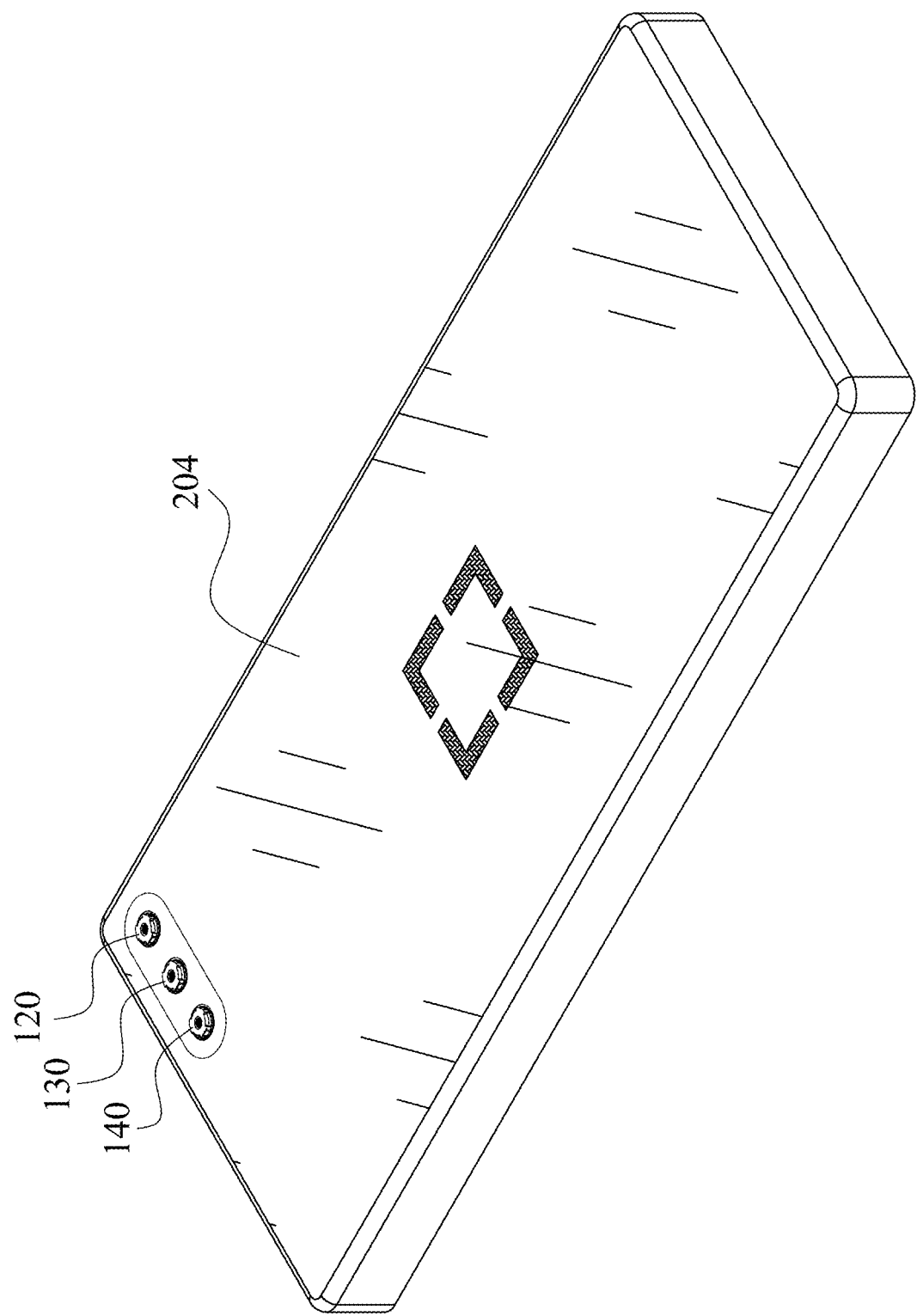
FIG. 9B is a schematic view of another side of the electronic device of FIG. 9A.
Figure 9C:
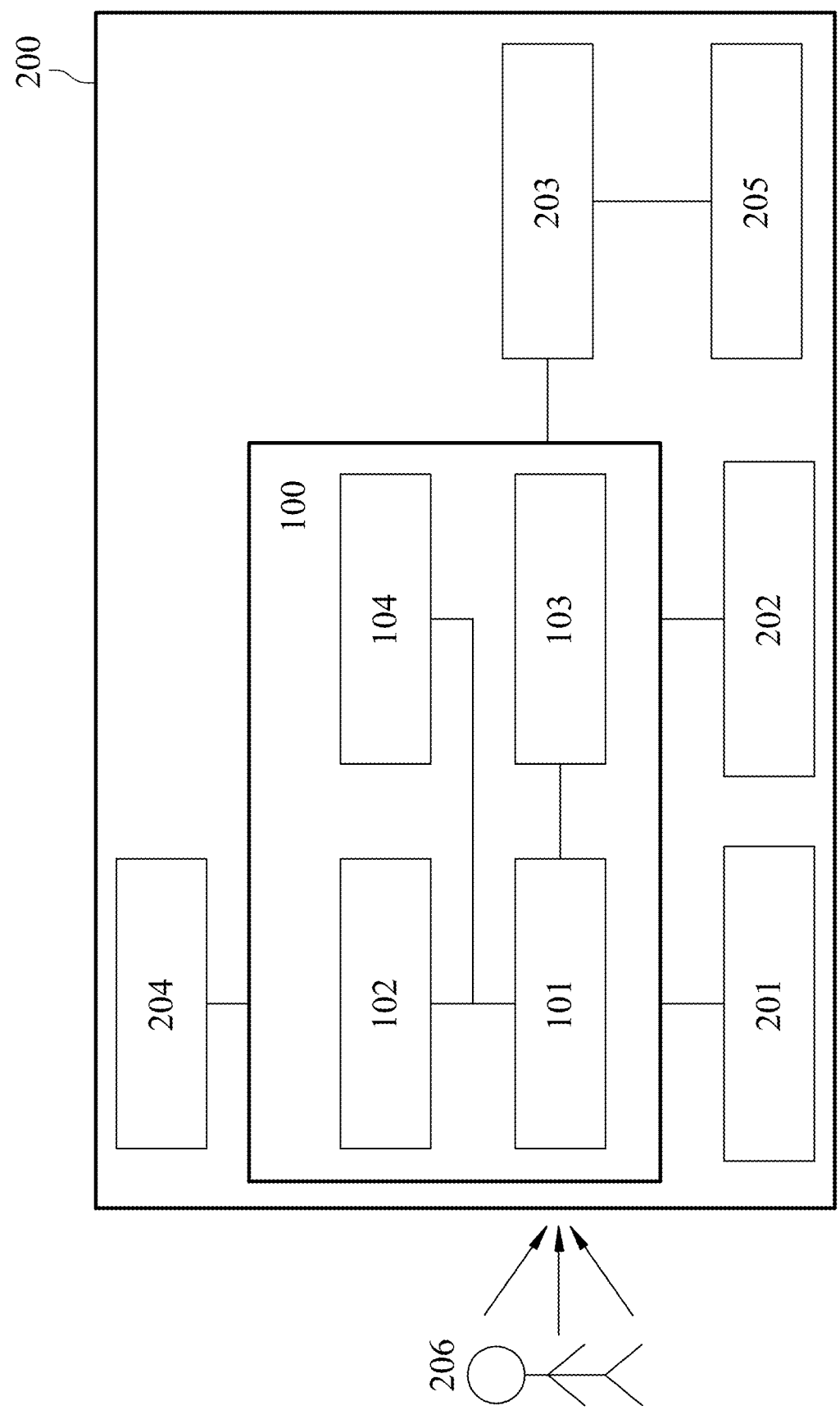
FIG. 9C is a system schematic view of the electronic device of FIG. 9A.

Please refer to FIG. 9A, FIG. 9B and FIG. 9C. FIG. 9A is a schematic view of one side of an electronic device 200 according to the 15th embodiment of the present disclosure. FIG. 9B is a schematic view of another side of the electronic device 200 of FIG. 9A. FIG. 9C is a system schematic view of the electronic device 200 of FIG. 9A. In FIG. 9A, FIG. 9B and FIG. 9C, the electronic device 200 according to the 15th embodiment is a smartphone, which include imaging apparatuses 100, 110, 120, 130, 140, a flash module 201, a focusing assisting module 202, an image signal processor (ISP) 203, a user interface 204 and an image software processor 205, wherein each of the imaging apparatuses 120, 130, 140 is a front camera. When the user captures images of an imaged object 206 via the user interface 204, the electronic device 200 focuses and generates an image via at least one of the imaging apparatuses 100, 110, 120, 130, 140, while compensating for low illumination via the flash module 201 when necessary. Then, the electronic device 200 quickly focuses on the imaged object 206 according to its object distance information provided by the focusing assisting module 202, and optimizes the image via the image signal processor 203 and the image software processor 205. Thus, the image quality can be further enhanced. The focusing assisting module 202 can adopt conventional infrared or laser for obtaining quick focusing, and the user interface 204 can utilize a touch screen or a physical button for capturing and processing the image with various functions of the image processing software.

Each of the imaging apparatuses 100, 110, 120, 130, 140 according to the 15th embodiment can include the optical imaging lens assembly of the present disclosure, and can be the same or similar to the imaging apparatus 100 according to the aforementioned 14th embodiment, and will not describe again herein. In detail, according to the 15th embodiment, the imaging apparatuses 100, 110 can respectively be wide angle imaging apparatus and ultra-wide angle imaging apparatus, or respectively be wide angle imaging apparatus and telephoto imaging apparatus. The imaging apparatuses 120, 130, 140 can be wide angle imaging apparatus, ultra-wide angle imaging apparatus and TOF (Time-Of-Flight) module, respectively, or can be others imaging apparatuses, which will not be limited thereto. Further, the connecting relationships between each of the imaging apparatuses 110, 120, 130, 140 and other elements can be the same as the imaging apparatus 100 in FIG. 9C, or can be adaptively adjusted according to the type of the imaging apparatuses, which will not be shown and detailed described again.

16th Embodiment

Figure 10:
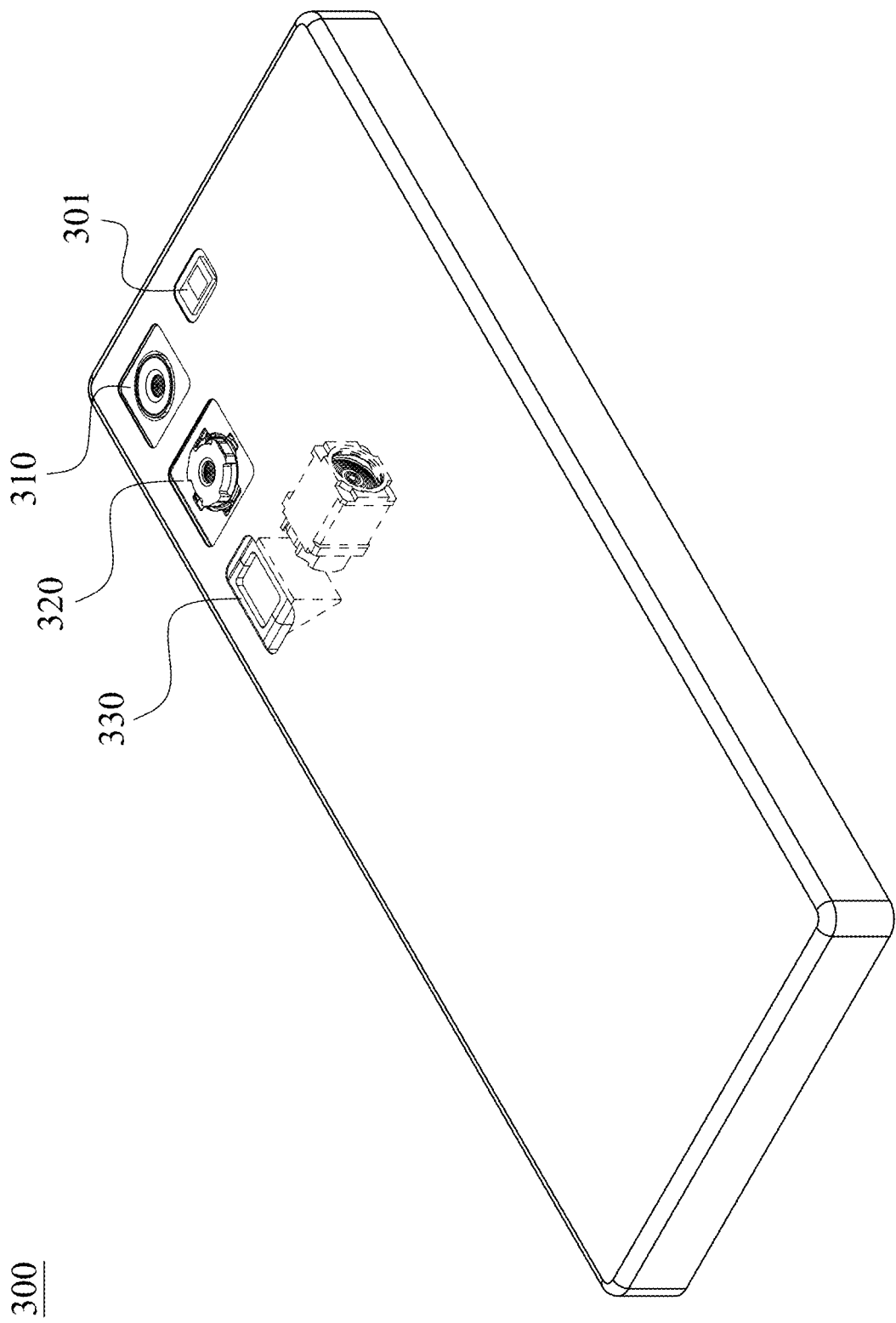
FIG. 10 is a schematic view of one side of an electronic device according to the 16th embodiment of the present disclosure.

Please refer to FIG. 10. FIG. 10 is a schematic view of one side of an electronic device 300 according to the 16th embodiment of the present disclosure. According to the 16th embodiment, the electronic device 300 is a smartphone, which include imaging apparatuses 310, 320, 330 and a flash module 301.

The electronic device 300 according to the 16th embodiment can include the same or similar elements to that according to the 15th embodiment, and each of the imaging apparatuses 310, 320, 330 according to the 16th embodiment can have a configuration which is the same or similar to that according to the 15th embodiment, and will not describe again herein. In detail, according to the 16th embodiment, each of the imaging apparatuses 310, 320, 330 can include the optical imaging lens assembly of the present disclosure, and can be the same or similar to the imaging apparatus 100 according to the aforementioned 14th embodiment, and will not describe again herein. In detail, the imaging apparatus 310 can be ultra-wide angle imaging apparatus, the imaging apparatus 320 can be wide angle imaging apparatus, the imaging apparatus 330 can be telephoto imaging apparatus (which can include light path folding element), or can be adaptively adjusted according to the type of the imaging apparatuses, which will not be limited to the arrangement.

17th Embodiment

Figure 11:
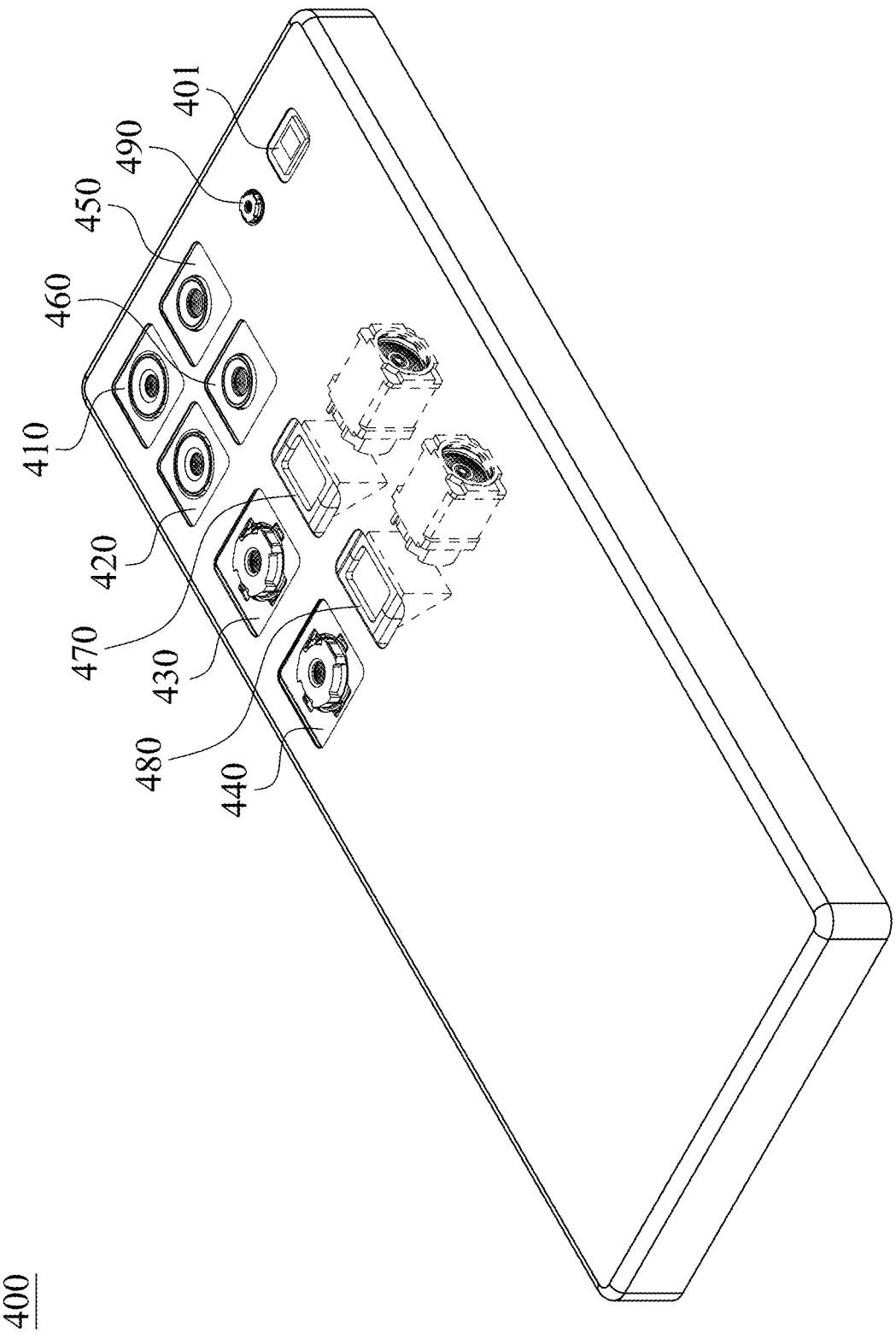
FIG. 11 is a schematic view of one side of an electronic device according to the 17th embodiment of the present disclosure.

Please refer to FIG. 11. FIG. 11 is a schematic view of one side of an electronic device 400 according to the 17th embodiment of the present disclosure. According to the 17th embodiment, the electronic device 400 is a smartphone, which include imaging apparatuses 410, 420, 430, 440, 450, 460, 470, 480, 490 and a flash module 401.

The electronic device 400 according to the 17th embodiment can include the same or similar elements to that according to the 15th embodiment, and each of the imaging apparatuses 410, 420, 430, 440, 450, 460, 470, 480, 490 and the flash module 401 can have a configuration which is the same or similar to that according to the 15th embodiment, and will not describe again herein. In detail, according to the 17th embodiment, each of the imaging apparatuses 410, 420, 430, 440, 450, 460, 470, 480, 490 can include the optical imaging lens assembly of the present disclosure, and can be the same or similar to the imaging apparatus 100 according to the aforementioned 14th embodiment, and will not describe again herein.

In detail, each of the imaging apparatuses 410, 420 can be ultra-wide angle imaging apparatus, each of the imaging apparatuses 430, 440 can be wide angle imaging apparatus, each of the imaging apparatuses 450, 460 can be telephoto imaging apparatus, each of the imaging apparatuses 470, 480 can be telephoto imaging apparatus (which can include light path folding element), the imaging apparatus 490 can be TOF module, or can be adaptively adjusted according to the type of the imaging apparatuses, which will not be limited to the arrangement.

18th Embodiment

Figure 12B:
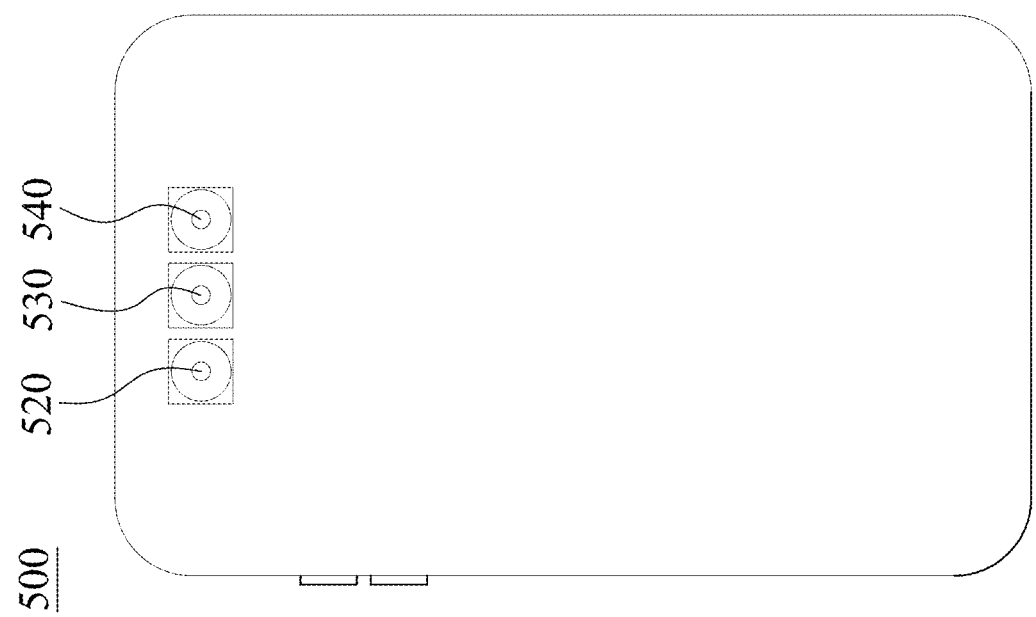
FIG. 12B is a schematic view of another side of the electronic device of FIG. 12A.
Figure 12A:
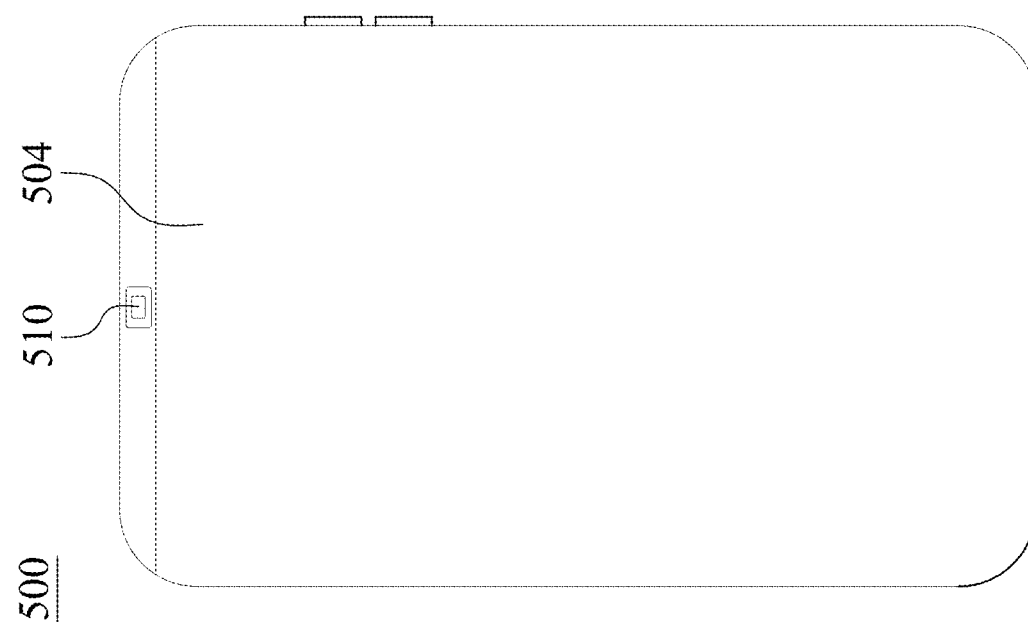
FIG. 12A is a schematic view of one side of an electronic device according to the 18th embodiment of the present disclosure.

Please refer to FIG. 12A and FIG. 12B. FIG. 12A is a schematic view of one side of an electronic device 500 according to the 18th embodiment of the present disclosure. FIG. 12B is a schematic view of another side of the electronic device 500 of FIG. 12A. In FIG. 12A and FIG. 12B, according to the 18th embodiment, the electronic device 500 is a smartphone, which include imaging apparatuses 510, 520, 530, 540 and a user interface 504.

The electronic device 500 according to the 18th embodiment can include the same or similar elements to that according to the 15th embodiment, and each of the imaging apparatuses 510, 520, 530, 540 and the user interface 504 can have a configuration which is the same or similar to that according to the 15th embodiment, and will not describe again herein. In detail, according to the 18th embodiment, the imaging apparatus 510 corresponds to a non-circular opening located on an outer side of the electronic device 500 for capturing the image, and the imaging apparatuses 520, 530, 540 can be telephoto imaging apparatus, wide angle imaging apparatus and ultra-wide angle imaging apparatus, respectively, or can be adaptively adjusted according to the type of the imaging apparatuses, which will not be limited to the arrangement.

19th Embodiment

Figure 13B:
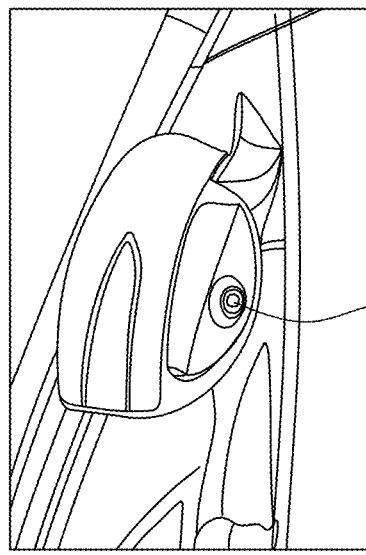
FIG. 13B is a partial enlarged view of the vehicle device of FIG. 13A.
Figure 13A:
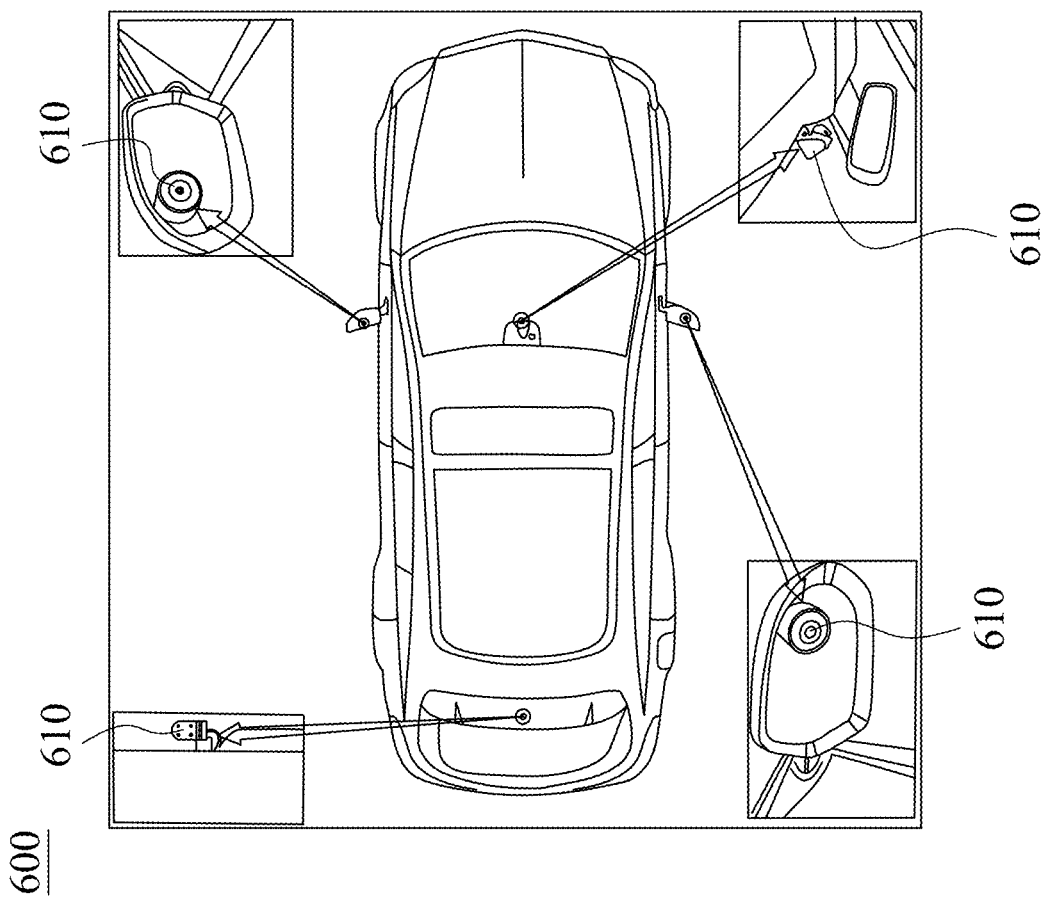
FIG. 13A is a top view of a vehicle device according to the 19th embodiment of the present disclosure.

Please refer to FIG. 13A. FIG. 13A is a top view of a vehicle device 600 according to the 19th embodiment of the present disclosure. In FIG. 13A, the vehicle device 600 includes a plurality of camera modules 610. Each of the camera modules 610 can include the optical imaging lens assembly according to any one of the aforementioned embodiments and an image sensor (not shown), the image sensor is disposed on an image surface (not shown) of the optical imaging lens assembly, but the present disclosure is not limited thereto.

Figure 13C:
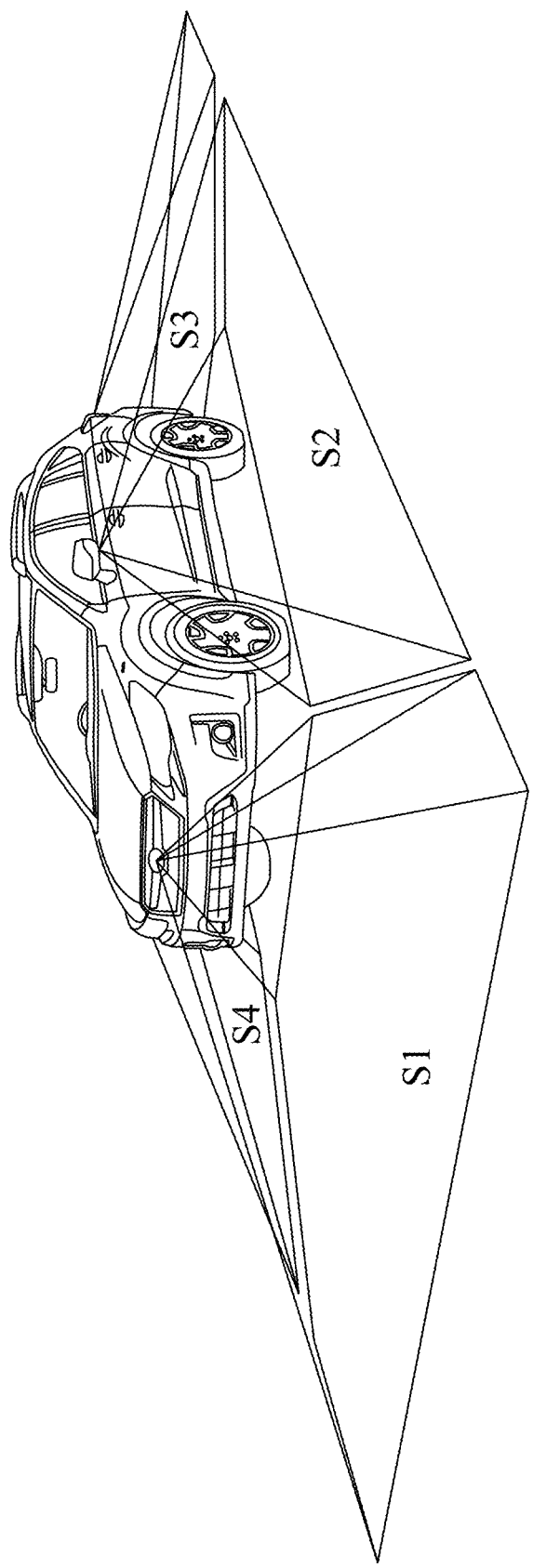
FIG. 13C is another schematic view of the vehicle device of FIG. 13A.

Please refer to FIG. 13B and FIG. 13C. FIG. 13B is a partial enlarged view of the vehicle device 600 of FIG. 13A. FIG. 13C is another schematic view of the vehicle device 600 of FIG. 13A. In FIG. 13A and FIG. 13B, the camera modules 610 can be disposed in an inner space of the vehicle device 600. Specifically, two of camera modules 610 can be disposed near a rear view mirror in the vehicle device 600 and a rear window, respectively. Moreover, another two of the camera modules 610 can be disposed on non-mirror surfaces of two rear view mirrors on left and right side of the vehicle device 600, respectively. In FIG. 13C, via the configuration of the camera modules 610, it is favorable for the driver obtaining the external space information out of the driving seat, such as the external space information S1, S2, S3, S4, but the present disclosure is not limited thereto. Hence, the angle of view can be provided widely to decrease the blind spot, and it is favorable for improving driving safety.

The multiple-layer coating technique is adopted on the surface of the optical lens element or the optical element of the optical imaging lens assembly in the present disclosure. Through the combination and arrangement of the high-low refractive coating and the gradient refractive coating, the excellent anti-reflective effect can be performed. The severe reflection problem at the peripheral region of the optical lens element caused by the light incident on the surface of the optical lens element with large angle could be reduced, and the transmittance of the optical imaging lens assembly can be effectively enhanced and the best anti-reflective effect can be obtained.

The uniform and compact anti-reflective coating is adopted in the present disclosure to significantly improve the anti-reflective ability of the material, so as to obtain the protection of the optical lens element and the optical element. According to the present disclosure, the coating thickness can be precisely controlled and the uniformity of the overall coating can be maintained by the atomic layer deposition method, which is suitable for the high-end optical imaging lens assembly whose curved-surface design is highly changeable.

According to the present disclosure, through the plurality of high refractive coating layers and low refractive coating layers of the high-low refractive coating being stacked in alternations, also through the optical interference by the difference of refractive indices and suitable design of coating layer thickness, the target of reducing reflection is achieved by the destructive interference of light on the surface of coating layers. Moreover, the anti-reflective effect in the wide field of wavelength region can be effectively provided because of the porous structure with gradually-changed size of the gradient refractive coating and the gradient refractive index thereof. The severe reflective problem of light at large angle can also be solved.

According to the present disclosure, the atomic layer deposition method is adopted to achieve the accuracy up to the atomic scale, which is not limited to the geometric shape of the surface of the optical imaging lens assembly. The coating thickness can be precisely controlled and the ability of evenly coating can be obtained, which is favorable for improving the changeability of the surface-shape design of the optical lens element. The uniform and compact anti-reflective coating is coated to the surface of the optical imaging lens assembly, so as to effectively prevent the moisture and oxygen in the air touches the surface of the optical lens assembly. Therefore, the optical lens element with relatively insufficient water-resistance and acid-resistance can obtain significant anti-oxidation ability, which is favorable for improving the quality of the optical lens element and the optical element, and the optical imaging lens assembly in which high imaging quality is needed is satisfied.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly, comprising:
   at least one optical lens element;
   wherein the optical lens element is made of glass, and the optical lens element comprises an anti-reflective coating, and the anti-reflective coating is arranged on at least one surface of the optical lens element comprising the anti-reflective coating;
   wherein the anti-reflective coating comprises a high-low refractive coating and a gradient refractive coating, and the high-low refractive coating is arranged between the optical lens element comprising the anti-reflective coating and the gradient refractive coating;
   wherein the high-low refractive coating comprises at least one high refractive coating layer and at least one low refractive coating layer, the high refractive coating layer and the low refractive coating layer are stacked in alternations, the low refractive coating layer is in contact with the optical lens element comprising the anti-reflective coating, and the low refractive coating layer is mainly made of aluminum oxide;
   wherein the gradient refractive coating comprises a plurality of holes, the holes away from the optical lens element comprising the anti-reflective coating are relatively larger than the holes close to the optical lens element comprising the anti-reflective coating, and the gradient refractive coating is mainly made of metal oxide;
   wherein a total thickness of the anti-reflective coating at a central region of the optical lens element comprising the anti-reflective coating is Tc, a total thickness of the anti-reflective coating at a peripheral region of the optical lens element comprising the anti-reflective coating is Tp, and the following condition is satisfied:

$0\% < |Tc-Tp|/Tc \leq 15.0\%$.

2. The optical imaging lens assembly of claim 1, wherein a total thickness of the anti-reflective coating is tTk, and the following condition is satisfied:

$200 \text{ nm} \leq tTK \leq 800 \text{ nm}$.

3. The optical imaging lens assembly of claim 1, wherein a refractive index of the high refractive coating layer is NH, and the following condition is satisfied:

$2.00 \leq NH$.

4. The optical imaging lens assembly of claim 1, wherein a refractive index of the low refractive coating layer is NL, and the following condition is satisfied:

$NL \leq 1.80$.

5. The optical imaging lens assembly of claim 1, wherein a total thickness of the high refractive coating layer is TNH, and the following condition is satisfied:

$1 \text{ nm} \leq TNH \leq 60 \text{ nm}$.

6. The optical imaging lens assembly of claim 1, wherein a total thickness of the low refractive coating layer is TNL, and the following condition is satisfied:

$1 \text{ nm} \leq TNL \leq 300 \text{ nm}$.

7. The optical imaging lens assembly of claim 1, wherein a thickness of the low refractive coating layer being in contact with the optical lens element comprising the anti-reflective coating is TL1, and the following condition is satisfied:

$10 \text{ nm} \leq TL1 \leq 100 \text{ nm}$.

8. The optical imaging lens assembly of claim 1, wherein a thickness of the gradient refractive coating is TNG, a total thickness of the anti-reflective coating is tTk, and the following condition is satisfied:

$0.45 \leq TNG/tTK \leq 0.85$.

9. The optical imaging lens assembly of claim 1, wherein the gradient refractive coating is made of aluminum oxide.

10. The optical imaging lens assembly of claim 1, wherein the total thickness of the anti-reflective coating at the central region of the optical lens element comprising the anti-reflective coating is Tc, the total thickness of the anti-reflective coating at the peripheral region of the optical lens element comprising the anti-reflective coating is Tp, and the following condition is satisfied:

$0\% < |Tc-Tp|/Tc \leq 10.0\%$.

11. The optical imaging lens assembly of claim 1, wherein a displacement in parallel with an optical axis at a maximum effective diameter position of a surface of the optical lens element comprising the anti-reflective coating is SAG, a total thickness of the anti-reflective coating is tTk, and the following condition is satisfied:

$0 \leq |SAG|/tTK \leq 10.0$.

12. The optical imaging lens assembly of claim 1, wherein an average reflectance in a wavelength range of 400 nm-1000 nm of the optical lens element comprising the anti-reflective coating is R40100, and the following condition is satisfied:

$0\% < R40100 \leq 1.00\%$.

13. The optical imaging lens assembly of claim 1, wherein an average reflectance in a wavelength range of 400 nm-700 nm of the optical lens element comprising the anti-reflective coating is R4070, and the following condition is satisfied:

$0\% < R4070 \leq 1.00\%$.

14. The optical imaging lens assembly of claim 1, wherein an average reflectance in a wavelength range of 700 nm-1000 nm of the optical lens element comprising the anti-reflective coating is R70100, and the following condition is satisfied:

$0\% < R70100 \leq 1.00\%.$

15. The optical imaging lens assembly of claim 1, wherein an Abbe number of the optical lens element comprising the anti-reflective coating is Vs, and the following condition is satisfied:

$35.0 \leq Vs \leq 85.0.$

16. The optical imaging lens assembly of claim 15, wherein a refractive index of the optical lens element comprising the anti-reflective coating is Ns, and the following condition is satisfied:

$Ns \leq 1.85.$

17. The optical imaging lens assembly of claim 1, wherein an ability of acid-proof of the optical lens element comprising the anti-reflective coating is Da, an Abbe number of the optical lens element comprising the anti-reflective coating is Vs, and the following condition is satisfied:

$0.6 \leq Vs \times Da/10 \leq 13.0.$

18. The optical imaging lens assembly of claim 14, wherein an ability of acid-proof of the optical lens element comprising the anti-reflective coating is Da, a refractive index of the optical lens element comprising the anti-reflective coating is Ns, and the following condition is satisfied:

$0.1 \leq Ns \times Da \leq 4.5.$

19. The optical imaging lens assembly of claim 1, wherein an ability of water-proof of the optical lens element comprising the anti-reflective coating is Dw, an Abbe number of the optical lens element comprising the anti-reflective coating is Vs, and the following condition is satisfied:

$0 < Vs \times Dw \leq 10.0.$

20. The optical imaging lens assembly of claim 16, wherein an ability of water-proof of the optical lens element comprising the anti-reflective coating is Dw, the refractive index of the optical lens element comprising the anti-reflective coating is Ns, and the following condition is satisfied:

$0 < Ns \times Dw \times 100 \leq 50.$

21. The optical imaging lens assembly of claim 1, further comprising at least one optical element, wherein the optical element is made of glass, the optical element comprises an anti-reflective coating, the anti-reflective coating of the optical element is arranged on at least one surface of the optical element comprising the anti-reflective coating, and the optical element comprising the anti-reflective coating is a prism.

22. An imaging apparatus, comprising:
the optical imaging lens assembly of claim 1; and
an image sensor disposed on an image surface of the optical imaging lens assembly.

23. An electronic device, which is a vehicle device, and the electronic device comprising:
the imaging apparatus of claim 22.

24. An optical imaging lens assembly, comprising:
at least two optical lens elements; and
at least one optical element;
wherein at least one of the optical lens elements comprises a long-wavelength absorbing material, the optical lens element comprising the long-wavelength absorbing material is made of a plastic material, and the long-wavelength absorbing material is evenly mixed with the plastic material;
wherein at least one of the optical lens elements comprises a long-wavelength filtering coating, the long-wavelength filtering coating is arranged on an object-side surface or an image-side surface of the optical lens element comprising the long-wavelength filtering coating, the long-wavelength filtering coating comprises a plurality of high refractive coating layers and a plurality of low refractive coating layers, and the high refractive coating layers of the long-wavelength filtering coating and the low refractive coating layers of the long-wavelength filtering coating are stacked in alternations;
wherein the optical element is made of glass, the optical element comprises an anti-reflective coating, the anti-reflective coating of the optical element is arranged on at least one surface of the optical element comprising the anti-reflective coating, and the optical element comprising the anti-reflective coating is a planar lens element;
wherein the anti-reflective coating of the optical element comprises a high-low refractive coating and a gradient refractive coating, and the high-low refractive coating is arranged between the optical element comprising the anti-reflective coating and the gradient refractive coating;
wherein the high-low refractive coating comprises at least one high refractive coating layer and at least one low refractive coating layer, the high refractive coating layer of the high-low refractive coating and the low refractive coating layer of the high-low refractive coating are stacked in alternations, the low refractive coating layer of the high-low refractive coating is in contact with the optical element comprising the anti-reflective coating, and the low refractive coating layer of the high-low refractive coating is mainly made of aluminum oxide;
wherein the gradient refractive coating comprises a plurality of holes, the holes away from the optical element comprising the anti-reflective coating are relatively larger than the holes close to the optical element comprising the anti-reflective coating, and the gradient refractive coating is mainly made of metal oxide.

* * * * *